US012594659B2

(12) United States Patent
Fallon et al.

(10) Patent No.: US 12,594,659 B2
(45) Date of Patent: Apr. 7, 2026

(54) FLUID-POWERED TORQUE WRENCH WITH FLUID PUMP CONTROLS

(71) Applicant: Enerpac Tool Group Corp., Milwaukee, WI (US)

(72) Inventors: Barry Fallon, Kings Heath (GB); Tom Foley, Bilston (GB); Tyler Jeffrey Johnson, Ripon, WI (US); Niklas Linn Olson, Antigo, WI (US); Luke Wesley Waddingham, Milwaukee, WI (US); Joe Vernam, Darlaston (GB); Samantha Ann Teumer, Jackson, WI (US)

(73) Assignee: Enerpac Tool Group Corp., Milwaukee, WI (US)

( * ) Notice: Subject to any disclaimer, the term of this patent is extended or adjusted under 35 U.S.C. 154(b) by 465 days.

(21) Appl. No.: 17/734,563

(22) Filed: May 2, 2022

(65) Prior Publication Data

US 2022/0250228 A1 Aug. 11, 2022

Related U.S. Application Data

(63) Continuation-in-part of application No. 16/735,309, filed on Jan. 6, 2020, now abandoned, which is a
(Continued)

(51) Int. Cl.
*B25F 5/02* (2006.01)
*B25B 21/00* (2006.01)

(52) U.S. Cl.
CPC .............. *B25F 5/02* (2013.01); *B25B 21/002* (2013.01)

(58) Field of Classification Search
CPC ....... B25B 21/002; B25B 21/005; B25F 5/02; B25F 5/005
(Continued)

(56) References Cited

U.S. PATENT DOCUMENTS

| | | | |
|---|---|---|---|
| 3,633,446 A | 1/1972 | Tadahira et al. | |
| 3,868,872 A * | 3/1975 | Wing | B25B 21/002 81/55 |

(Continued)

FOREIGN PATENT DOCUMENTS

| | | |
|---|---|---|
| DE | 202006011224 U1 | 11/2007 |
| DE | 202008000921 U1 | 5/2009 |
| GB | 2592721 | 9/2021 |

OTHER PUBLICATIONS

Combined Search and Examination Report for issued in Corresponding GB Application No. 2305951.2, dated Oct. 18, 2023.

(Continued)

*Primary Examiner* — Hadi Shakeri
(74) *Attorney, Agent, or Firm* — Andrus Intellectual Property Law, LLP

(57) ABSTRACT

A control assembly, a tool and a method. The assembly may include a handle assembly including a first handle portion and a second handle portion, the handle assembly being removably connectable to a tool housing; and pump controls operable to control a pump to drive a tool drive mechanism and thereby an output member. Operation of the pump may require an operator's first hand on a first handle portion and the operator's second hand on a second handle portion. The pump may be operable under the control of the pump controls to drive the drive mechanism when the handle assembly is connected to the housing and when the handle assembly is disconnected from the housing.

27 Claims, 34 Drawing Sheets

Related U.S. Application Data continuation-in-part of application No. 15/584,819, filed on May 2, 2017, now abandoned.

(60) Provisional application No. 62/330,617, filed on May 2, 2016.

(58) Field of Classification Search
USPC ..................................................... 81/467
See application file for complete search history.

(56) References Cited

U.S. PATENT DOCUMENTS

| | | | | |
|---|---|---|---|---|
| 4,543,723 | A | 10/1985 | Bortfeld et al. | |
| 4,663,997 | A | 5/1987 | Junkers | |
| 6,289,770 | B1 | 9/2001 | Collins | |
| 6,443,675 | B1 * | 9/2002 | Kopras | B25F 5/026 409/137 |
| D465,394 | S | 11/2002 | Junkers | |
| 6,598,502 | B1 * | 7/2003 | Rosa | F16L 39/04 81/57.39 |
| D491,436 | S | 6/2004 | Junkers | |
| 6,912,933 | B2 | 7/2005 | Knopp et al. | |
| 7,146,880 | B1 * | 12/2006 | Francis | B25B 23/0078 81/57.44 |
| 7,654,294 | B2 * | 2/2010 | Cooper | B25F 5/02 144/136.95 |
| D724,403 | S | 3/2015 | Spirer | |
| D730,135 | S | 5/2015 | Spirer | |
| 9,446,533 | B2 | 9/2016 | O'Banion et al. | |
| D793,191 | S | 8/2017 | Palsson | |
| 2014/0166323 | A1 * | 6/2014 | Cooper | F16P 3/147 173/176 |
| 2020/0139520 | A1 | 5/2020 | Fallon et al. | |

OTHER PUBLICATIONS

United States Patent Office Action for U.S. Appl. No. 29/563,103 dated Sep. 8, 2017 (4 pages).

Search Report issued from the United Kingdom Patent Office for related Application No. GB2020045.7 dated Jun. 3, 2021 (3 Pages).

* cited by examiner

FLUID-POWERED TORQUE WRENCH WITH FLUID PUMP CONTROLS

RELATED APPLICATIONS

The present application is a continuation-in-part of U.S. patent application Ser. No. 16/735,309, filed Jan. 6, 2020, which is a continuation-in-part of U.S. patent application Ser. No. 15/584,819, tiled May 2, 2017, which claims the benefit of U.S. Provisional Patent Application No. 62/330,617, filed May 2, 2016, and is related to U.S. Design patent application Ser. No. 29/563,103, filed May 2, 2016, the entire contents of all of which are hereby incorporated by reference.

FIELD

The present invention relates to a tool, such as a fluid-powered torque wrench, and, more particularly, to such a tool in which the controls require two-hand operation.

SUMMARY

Fluid-powered wrenches designed for the transmission of rotational power to threaded fasteners are widely used tools in industry. There are a variety of different types of power wrenches, but one typical wrench design consists of a fluid-driven, reciprocating piston driving a socket. These reciprocating piston-style torque wrenches are commonly used in flange bolting operations due to their compact nature.

With reciprocating piston-style torque wrenches, a fluid pump is coupled to the wrench via a hose to drive the piston. The pump is typically actuated via controls located on the pump or coupled to the pump via a pendant.

In operation, it is common to use two technicians to operate this style of wrench. One technician positions the wrench on the nut to be tightened. Once in position and clear of pinch points, that technician communicates to the other technician to operate the pump to actuate the wrench. Miscommunication may result undesirable operations, especially for the first technician.

Thus, a need may exist to allow a single technician to operate a reciprocating piston-style fluid-operated torque wrench. Some much larger electronic, motor-driven torque wrenches (sometimes called torque multipliers) allow for this, but such operation is not known for the much more compact piston-style fluid-operated torque wrenches.

A further need may exist to have such a reciprocating piston-style fluid-operated torque wrench that can also remain compact.

In one independent aspect, a reciprocating piston-style torque wrench having pump controls coupled to the torque wrench may be provided. In some embodiments, the pump controls may be selectively coupled to the torque wrench to allow the wrench to fit into tight areas while keeping the controls adjacent the wrench.

In another independent aspect, a handle with pump controls may be coupled to a fluid operated, reciprocating piston style torque wrench. In some embodiments, the handle may be selectively coupled to the wrench to allow the wrench to fit into tight areas.

In yet another independent aspect, a handle with pump controls may be coupled to the reciprocating piston-style torque wrench, wherein the handle requires two-hand operation.

In one particular independent embodiment, a fluid-operated, reciprocating piston-style torque wrench having fluid pump controls selectively coupled to the torque wrench may be provided. The wrench may further include a handle housing the pump controls, the handle being selectively coupled to the torque wrench. The handle may include a first grasping location and a. second grasping location, wherein the wrench cannot be operated unless an operator's hands are on both grasping locations. The handle may further include a first actuator located adjacent the first grasping location and a second actuator located adjacent the second grasping location and wherein the wrench cannot operate unless both actuators are actuated.

In a further independent embodiment, a control assembly for a fluid-operated, reciprocating piston-style torque wrench may be provided. The wrench may include a housing, and a reciprocating drive mechanism supported by the housing, the drive mechanism being selectively-driven by a fluid pump and operable to drive an output member. The assembly may generally include a body connectable to the housing; a first handle and a second handle connected to the body; a first sensor operable to sense an operator's first hand on the first handle; and a second sensor operable to sense the operator's second hand on the second handle. Operation of the pump may require sensing the operator's first hand on the first handle while sensing the operator's second hand on the second handle.

In another independent embodiment, a torque wrench may generally include a housing; a reciprocating drive mechanism supported by the housing, the drive mechanism being selectively-driven by a fluid pump and operable to drive an output member; and a control assembly. The control assembly may include a body connected to the housing, a first handle and a second handle connected to the body, and pump controls operable to control the pump to drive the drive mechanism and thereby the output member. The pump controls may include a first pump control supported proximate the first handle, the first pump control being operable by a digit of a first hand of an operator gripping the first handle, and a second pump control supported proximate the second handle, the second pump control being operable by a digit of a second hand of the operator on the second handle. The pump may be operable upon operation of the first pump control and the second pump control.

In yet another independent embodiment, a method of operating a fluid-operated, reciprocating piston-style torque wrench may be provided. The wrench may include a housing, and a reciprocating drive mechanism supported by the housing and operable to drive an output member. The method may generally include providing a control assembly connected to the housing, the control assembly including a body connected to the housing and a first handle and a second handle connected to the body; positioning the output member relative to a fastener to be adjusted; and after positioning, operating a fluid pump to drive the drive mechanism and thereby the output member to adjust the fastener, operating including sensing the operator's first hand on the first handle while sensing the operator's second hand on the second handle.

In a further independent embodiment, a control assembly for a fluid-operated tool may be provided. The tool may include a housing, and a drive mechanism supported by the housing, the drive mechanism being selectively-driven by a fluid pump and operable to drive an output member. The control assembly may include a handle assembly removably connected to the housing and including a first handle portion and a second handle portion and pump controls operable to control the pump to drive the drive mechanism and thereby the output member. The pump controls may include a first pump control operable by a digit of an operator's first hand on the first handle portion, the first pump control being in communication with the pump when the handle assembly is connected to the housing and when the handle assembly is disconnected from the housing, and a second pump control operable by a digit of the operator's second hand on the second handle portion, the second pump control being in communication with the pump when the handle assembly is connected to the housing and when the handle assembly is disconnected from the housing. Operation of the pump may require the operator's first hand on the first handle portion and the operator's second hand on the second handle portion. The pump may be operable under the control of the pump controls to drive the drive mechanism when the handle assembly is connected to the housing and when the handle assembly is disconnected from the housing.

In another independent embodiment, a tool may be provided. The tool may generally include a housing, a drive mechanism supported by the housing, the drive mechanism being selectively-driven by a fluid pump and operable to drive an output member, and a control assembly. The control assembly may include a handle assembly removably connectable to the housing and including a first handle portion and a second handle portion and pump controls operable to control the pump to drive the drive mechanism and thereby the output member, the pump controls being in communication with the pump when the handle assembly is connected to the housing and when the handle assembly is disconnected from the housing. The pump controls may include a first pump control supported proximate the first handle portion, the first pump control being operable by a digit of a first hand of an operator gripping the first handle portion, and a second pump control supported proximate the second handle portion, the second pump control being operable by a digit of a second hand of the operator on the second handle portion. Operation of the pump may require the operator's first hand on the first handle portion and the operator's second hand on the second handle portion. The pump may be operable under the control of the pump controls to drive the drive mechanism when the handle assembly is connected to the housing and when the handle assembly is disconnected from the housing.

in yet another independent embodiment, a method of operating a fluid-operated tool may be provided. The tool may include a housing and a drive mechanism supported by the housing and operable to drive an output member. The method may generally include providing a control assembly including a handle assembly separate from the housing, the handle assembly including a first handle portion and a second handle portion; selectively and alternatively releasably connecting the handle assembly to the housing and disconnecting the handle assembly from the housing; positioning the output member relative to a fastener to be adjusted; when the handle assembly is connected to the housing, after positioning, operating a fluid pump to drive the chive mechanism and thereby the output member, operating including sensing an operator's first hand on the first handle portion while sensing the operator's second hand on the second handle portion; and, when the handle assembly is disconnected from the housing, after positioning, operating the fluid pump to drive the drive mechanism and thereby the output member, operating including sensing the operator's first hand on the first handle portion while sensing the operator's second hand on the second handle portion.

Other independent aspects, features and/or advantages of the invention may become apparent to those skilled in the art upon review of the detailed description, claims and drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted", "connected", "supported", and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 1:
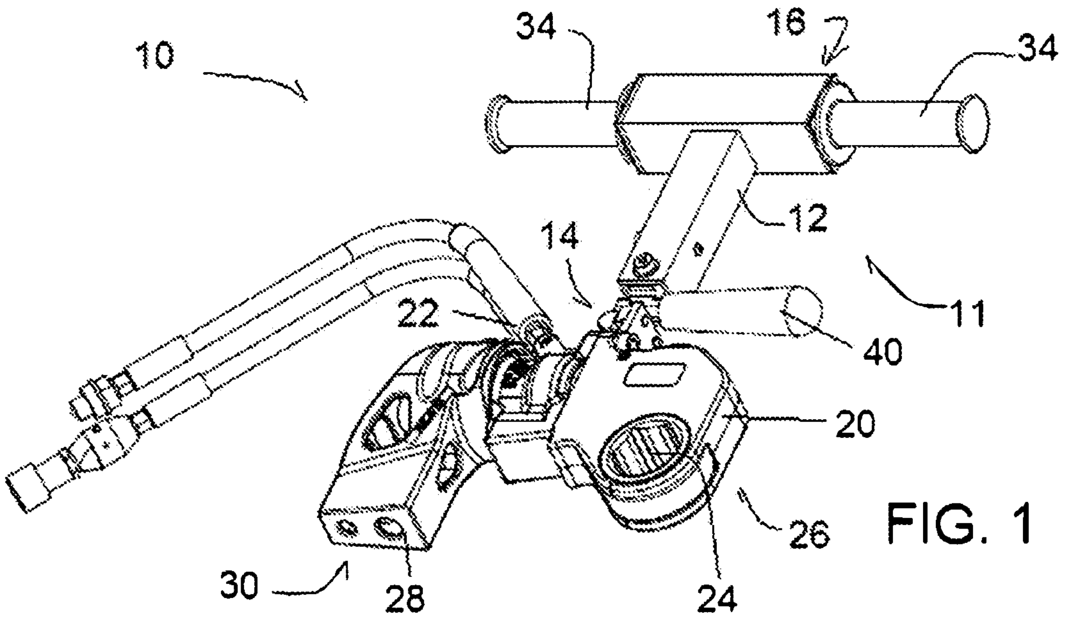
FIG. 1 is a perspective view of one independent embodiment of a reciprocating piston fluid-operated torque wrench having integrated controls.
Figure 2:
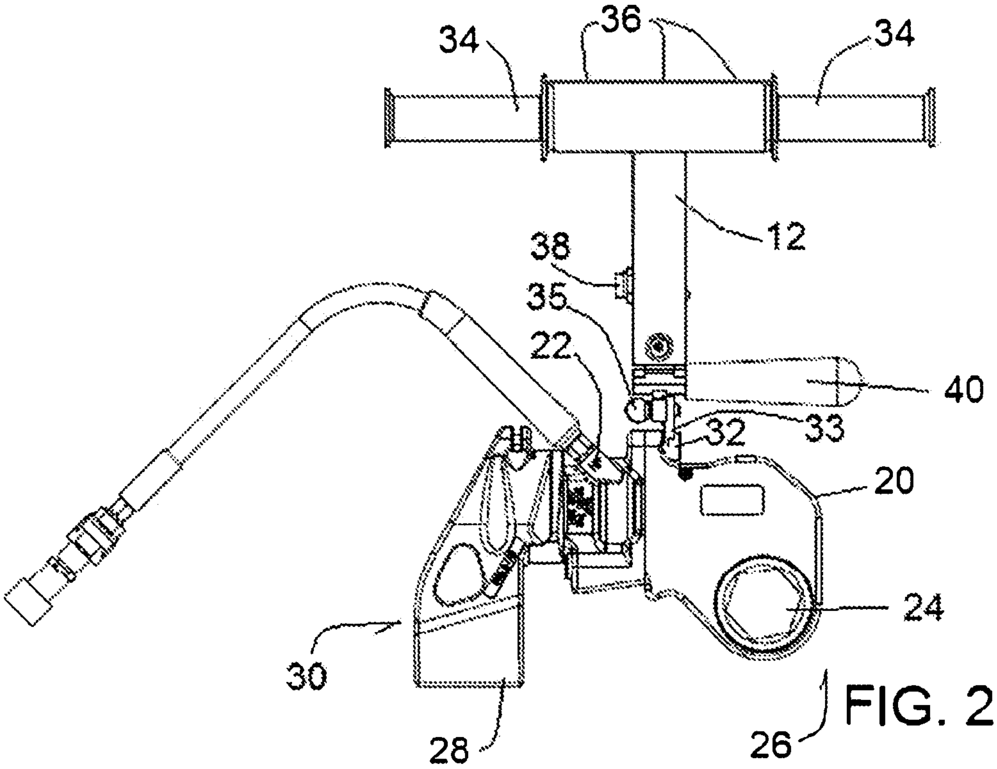
FIG. 2 is a top view of the wrench and control assembly of FIG. 1.

Referring now to FIGS. 1 and 2, a wrench with selectively integrated controls 10 is provided. The wrench with selectively integrated controls 10 includes a control assembly 11 coupled to a reciprocating piston style torque wrench 20.

The control assembly 11 includes a body 12 having a first end 14 selectively coupled to the wrench 20 and a second end 16 supporting controls 36 for a remotely-located fluid pump (not shown), such as a hydraulic pump.

The torque wrench 20 can be a conventional compact, relatively flat wrench, such as that described in U.S. Pat. Nos. 4,825,730 and 4,982,626, which are hereby incorporated by reference with respect to the construction and operation of a reciprocating piston-style, fluid-operated torque wrench.

As illustrated, the wrench 20 has a housing containing the reciprocating piston drive mechanism (not shown). The housing includes fluid inputs and outputs 22 which fluidly communicate with a remotely-located fluid pump to selectively drive the piston drive mechanism. The wrench 20 further includes a socket 24 on one end 26 and a reaction arm 28 on the opposite end 30. Although the socket 24 is illustrated as a hexagonal opening, in other constructions (not shown), the socket can be a driver, such as a square projecting socket driver. However, in low clearance operations, a hexagonal opening is typically utilized.

In conventional operation of the wrench 20, the socket 24 is placed on a nut (not shown) by a first operator with the reaction arm 28 in engagement with a portion of a flange or an adjacent nut (also not shown). Once the wrench 20 is securely in position and the first operator is clear, the second operator actuates the pump remotely to provide fluid to the wrench 20, which drives the drive mechanism, and turns the socket 24 while the reaction arm 28 pushes against the reaction surface. Upon completion of the torque application, the second operator turns the pump off, and the first operator moves the wrench 20 to another nut. This process is then repeated for all nuts on a flange.

As noted above, this can be a cumbersome operation with either two operators or with one operator switching from wrench manipulation to pump control manipulation. Thus, a pump control coupled to the wrench 20 may be desirable to allow single person operation without the need to switch between manipulation of the wrench 20 and the pump—or without reliance upon another person. The control assembly 11 provides such operation.

As shown in FIGS. 1 and 2, a control assembly 11 is coupled to the wrench 20. The control assembly 11 is coupled to wrench 20 with a fastener 35 allowing the control assembly 11 to be selectively coupled (and decoupled) to the wrench 20. In the illustrated construction, threaded fasteners are used to connect the first end 14 of the body 12 to the wrench 20. In other constructions (not shown), the control assembly 11 can be permanently coupled to the wrench 20.

In the illustrated construction, the control assembly 11 is coupled to the wrench 20 via a first fastener 32, a mounting bracket 33, and second fastener 35. The first fastener 32 connects the mounting bracket 33 to the wrench 20. The second fastener 35 connects the first end of the body 12 to the mounting bracket 33. As illustrated, the second fastener 35 includes a thumb screw allowing for easy operator manipulation to selectively remove the control assembly 11 from the wrench 20. In some constructions, mounting brackets may be sized differently for different wrenches while the interconnection between the control assembly 11 and the bracket 33 is standardized.

FIGS. 3-7 illustrate the control assembly 11 of FIGS. 1 and 2 decoupled from the wrench 20. As shown, the body 12 is generally T-shaped with the bottom of the "T" terminating at the first end 14 and the top of the "T" at the second end 16. As shown, handles 34 can be coupled to the top of the I-shaped body 12 to form gripping surfaces during actuation of the wrench 20.

Figure 3:
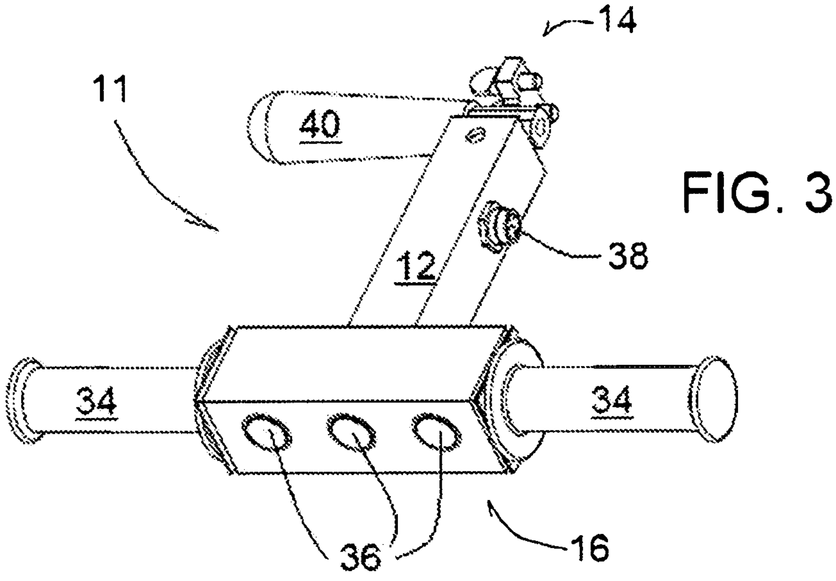
FIG. 3 is a first perspective view of the control assembly of FIG. 1.
Figure 6:
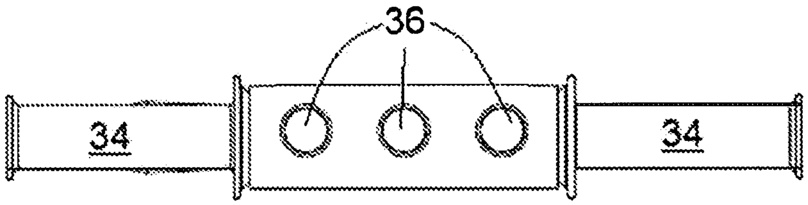
FIG. 6 is a front view of the control assembly of FIG. 1.
Figure 8:
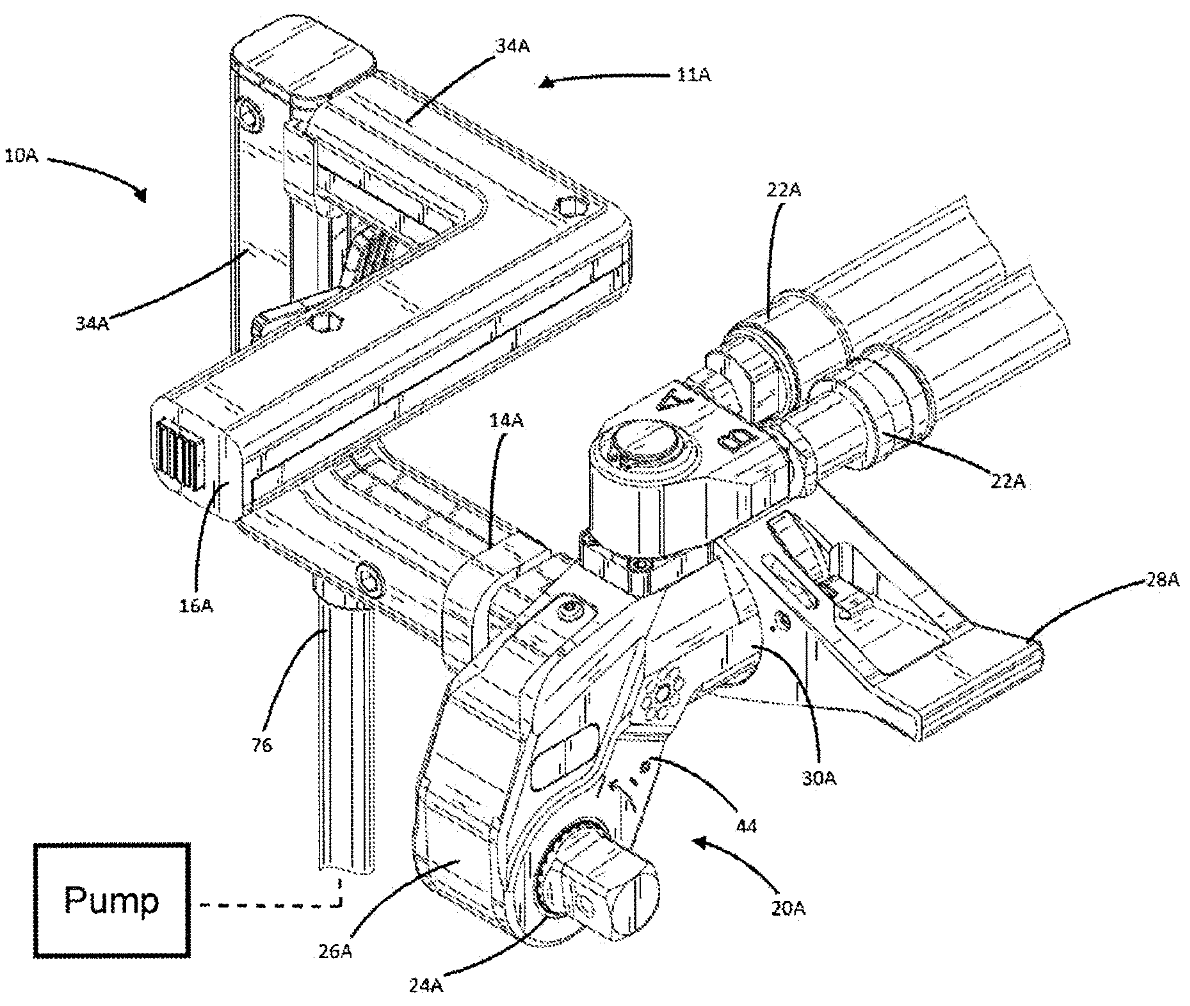
FIG. 8 is a perspective view of an alternative embodiment of a tool, such as a reciprocating piston fluid-operated torque wrench, having integrated controls.
Figure 9:
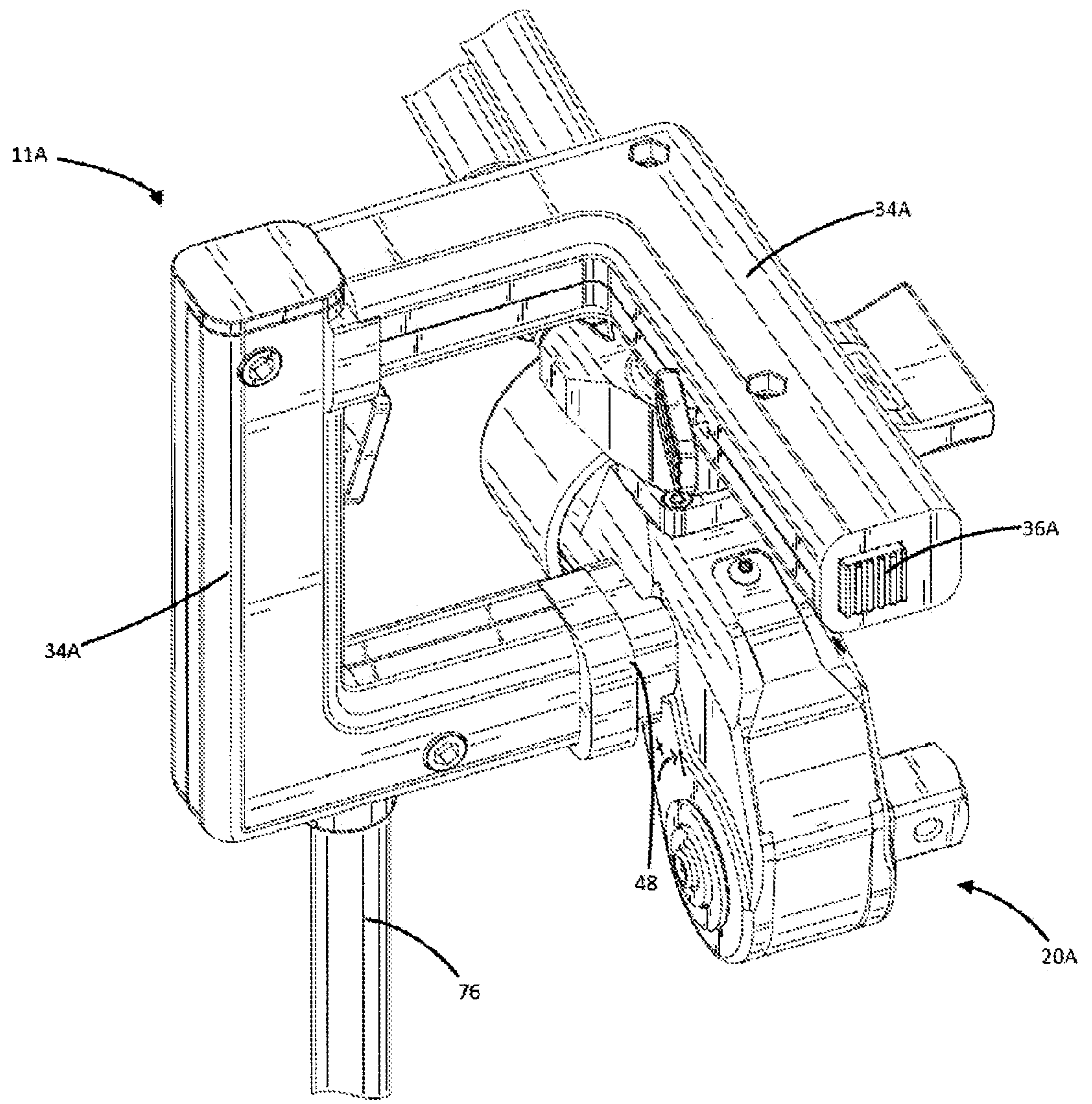
FIG. 9 is another perspective view of the tool and the control assembly of FIG. 8.
Figure 10:
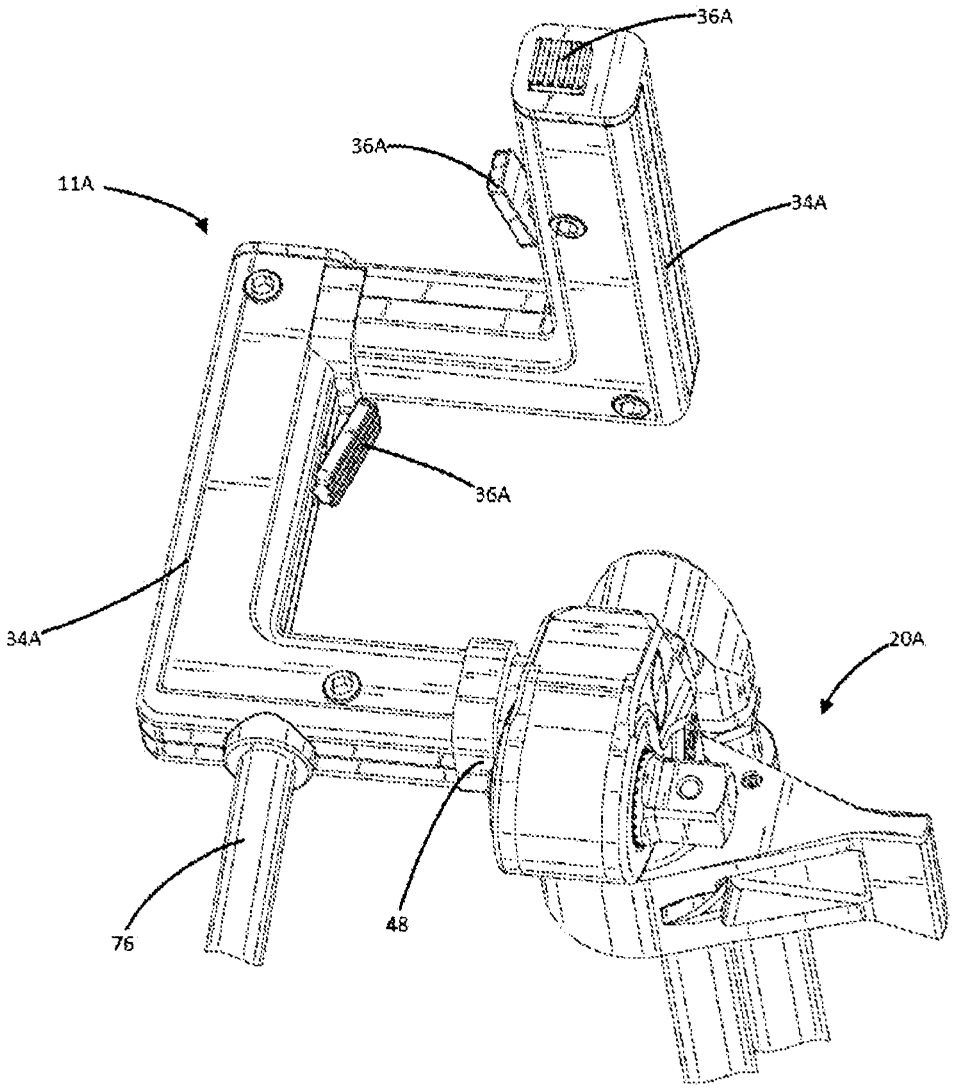
FIG. 10 is yet another perspective view of the tool and the control assembly of FIG. 8.
Figure 11:
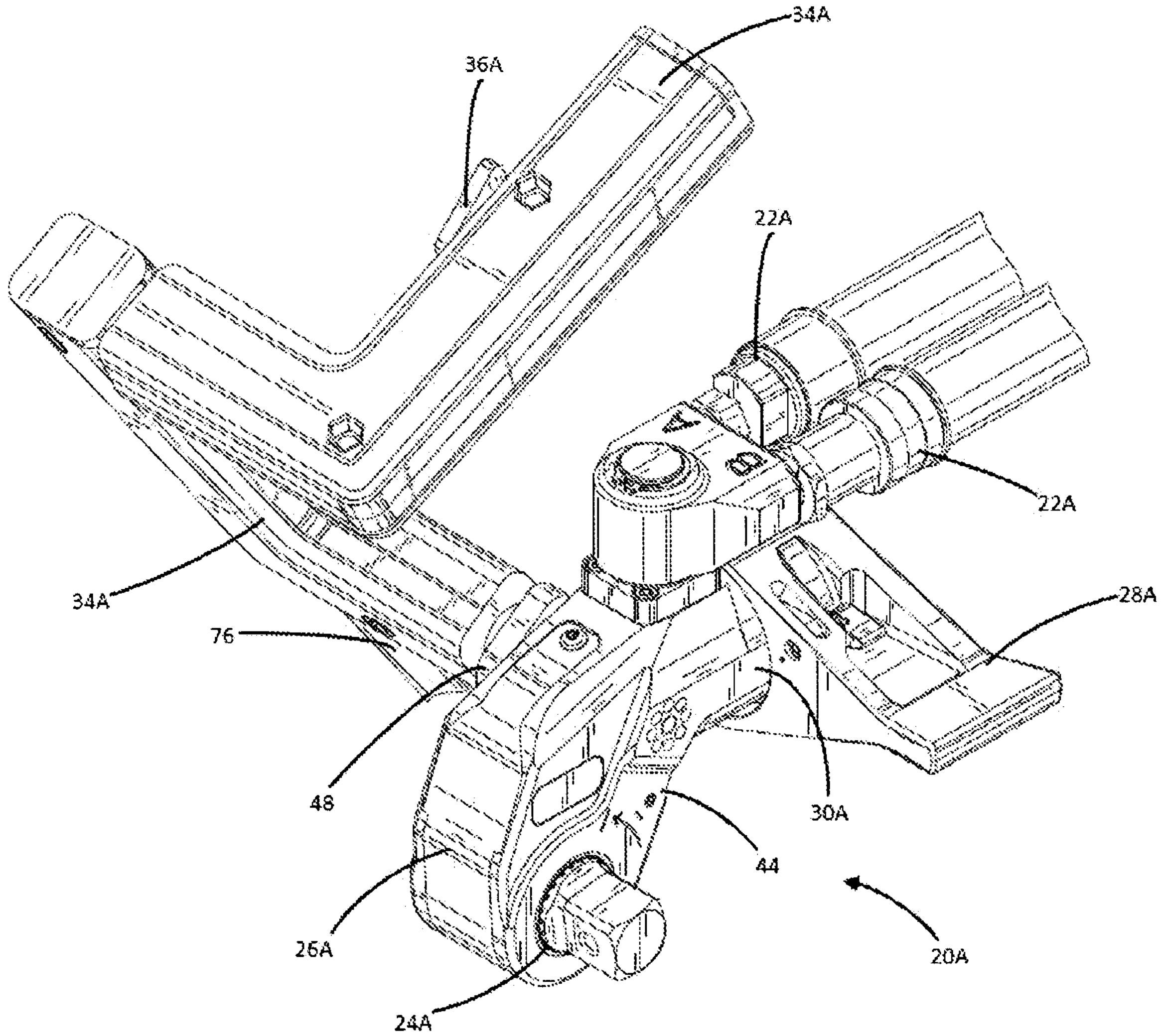
FIG. 11 is a further perspective view of the tool and the control assembly of FIG. 8, illustrating different pivoted positions of the control assembly and the handle portions.
Figure 12:
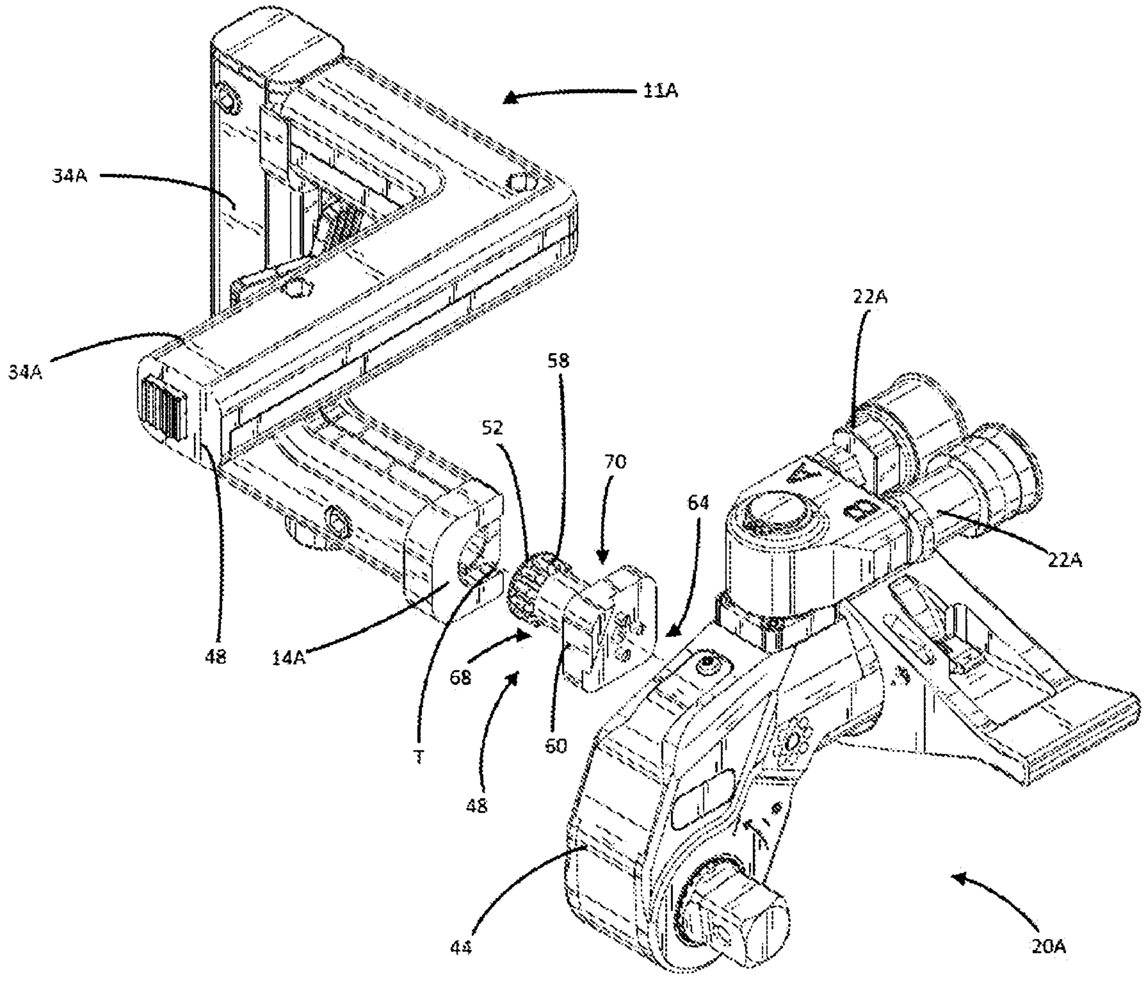
FIG. 12 is a fourth perspective view of the tool and the control assembly of FIG. 8, illustrating the tool, the control assembly and an adapter as separate components.
Figure 13:
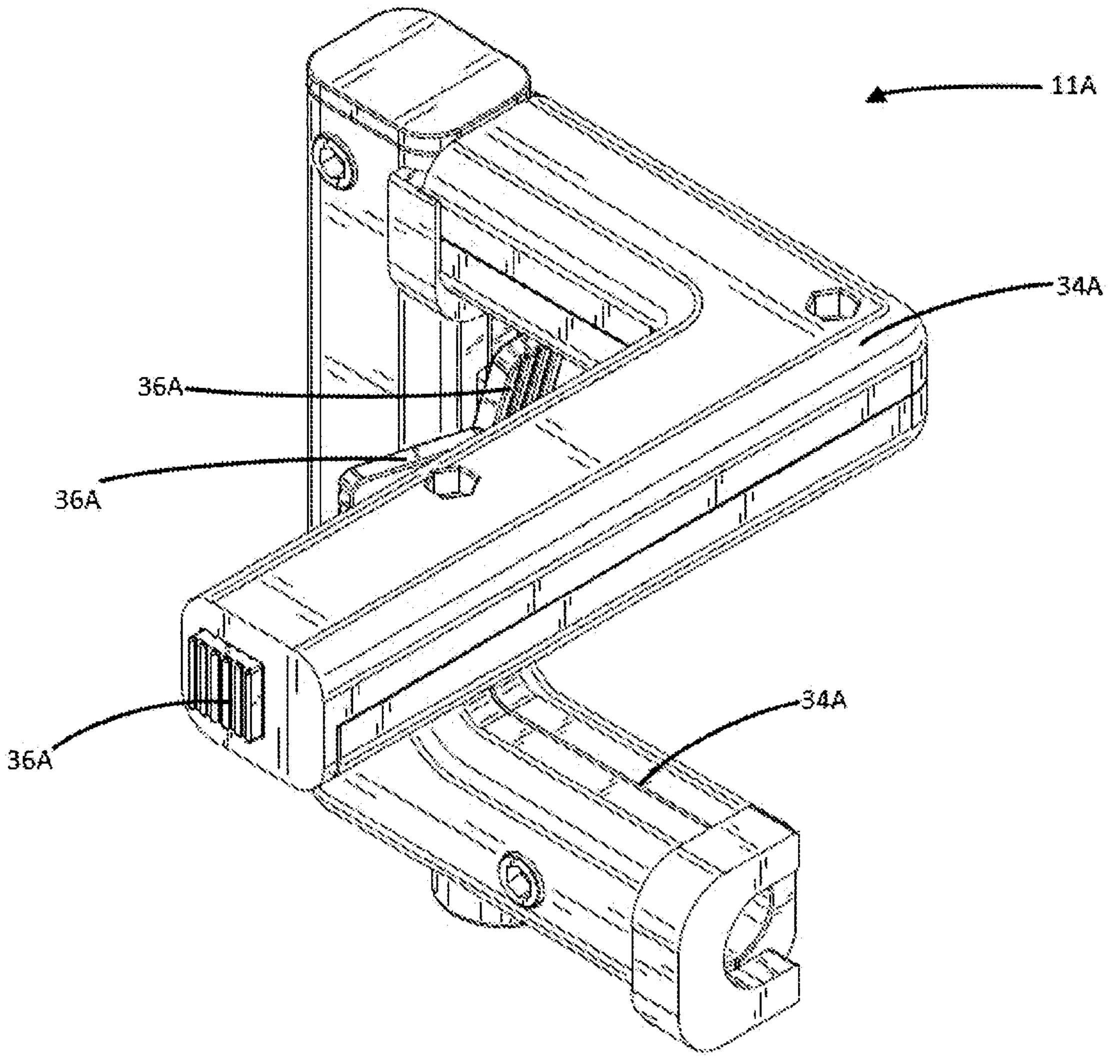
FIG. 13 is a perspective view of the handle assembly of FIG. 12.
Figure 14:
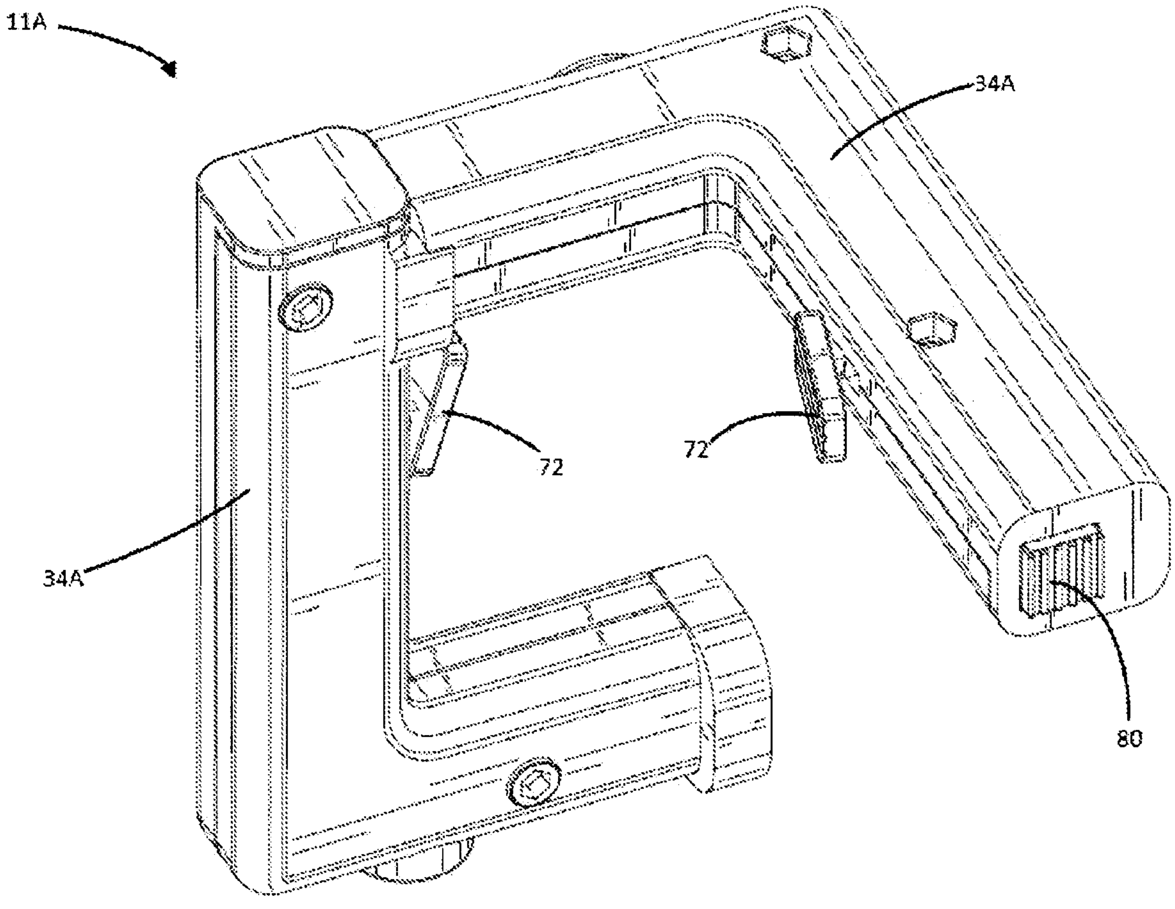
FIG. 14 is another perspective view of the handle assembly of FIG. 13.
Figure 15:
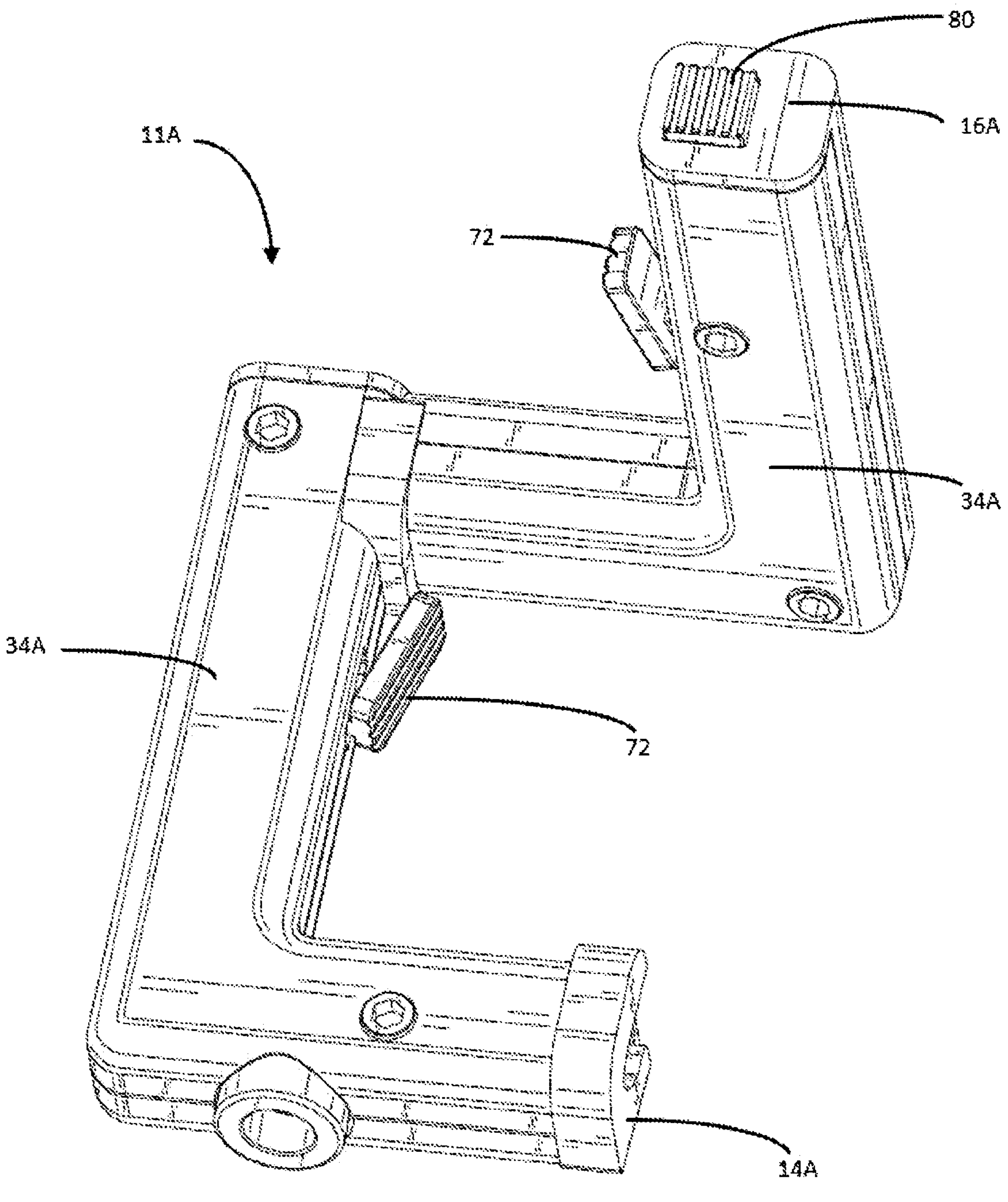
FIG. 15 is yet another perspective view of the handle assembly of FIG. 13.
Figure 16:
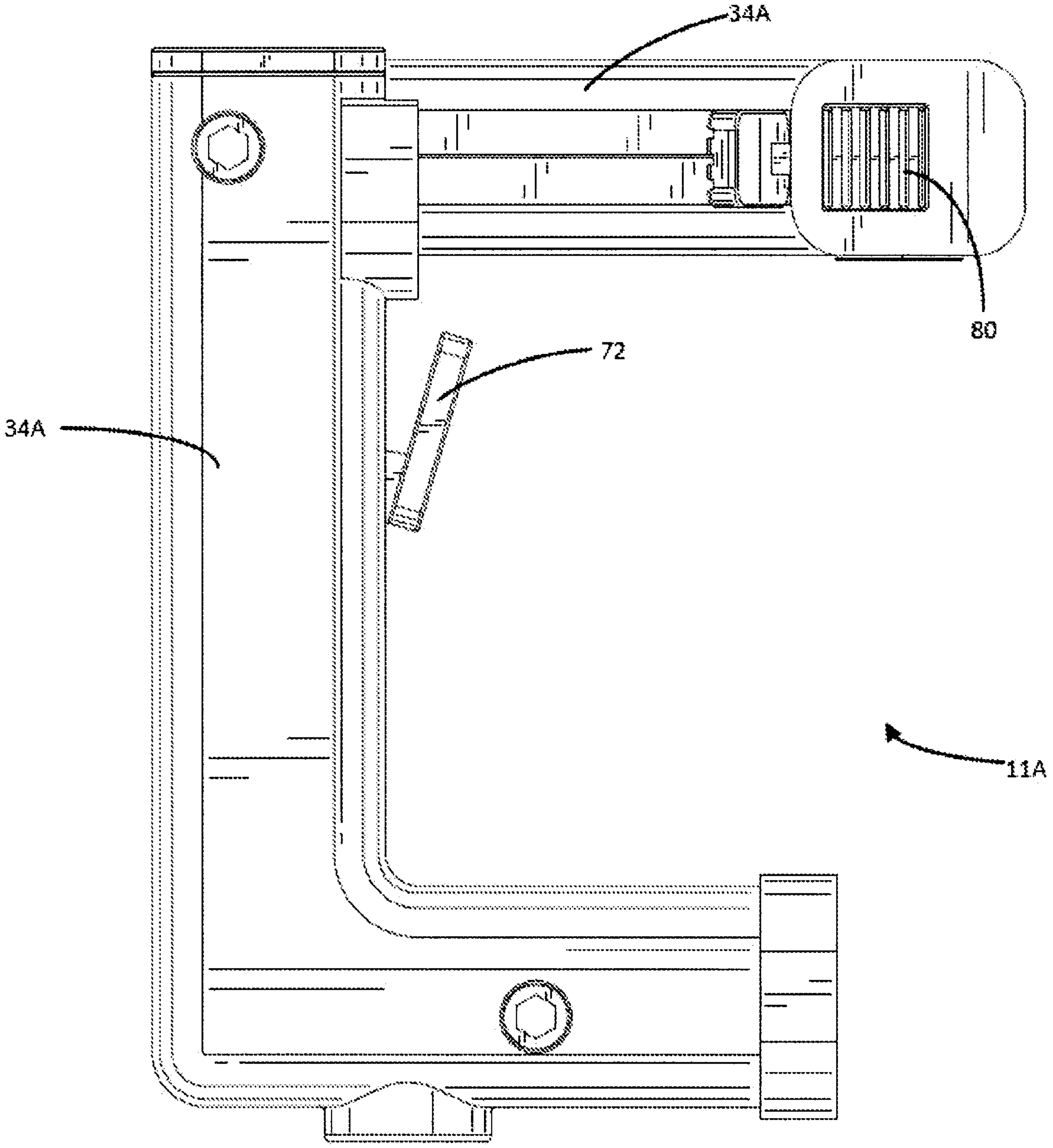
FIG. 16 is a front view of the handle assembly of FIG. 13.
Figure 17:
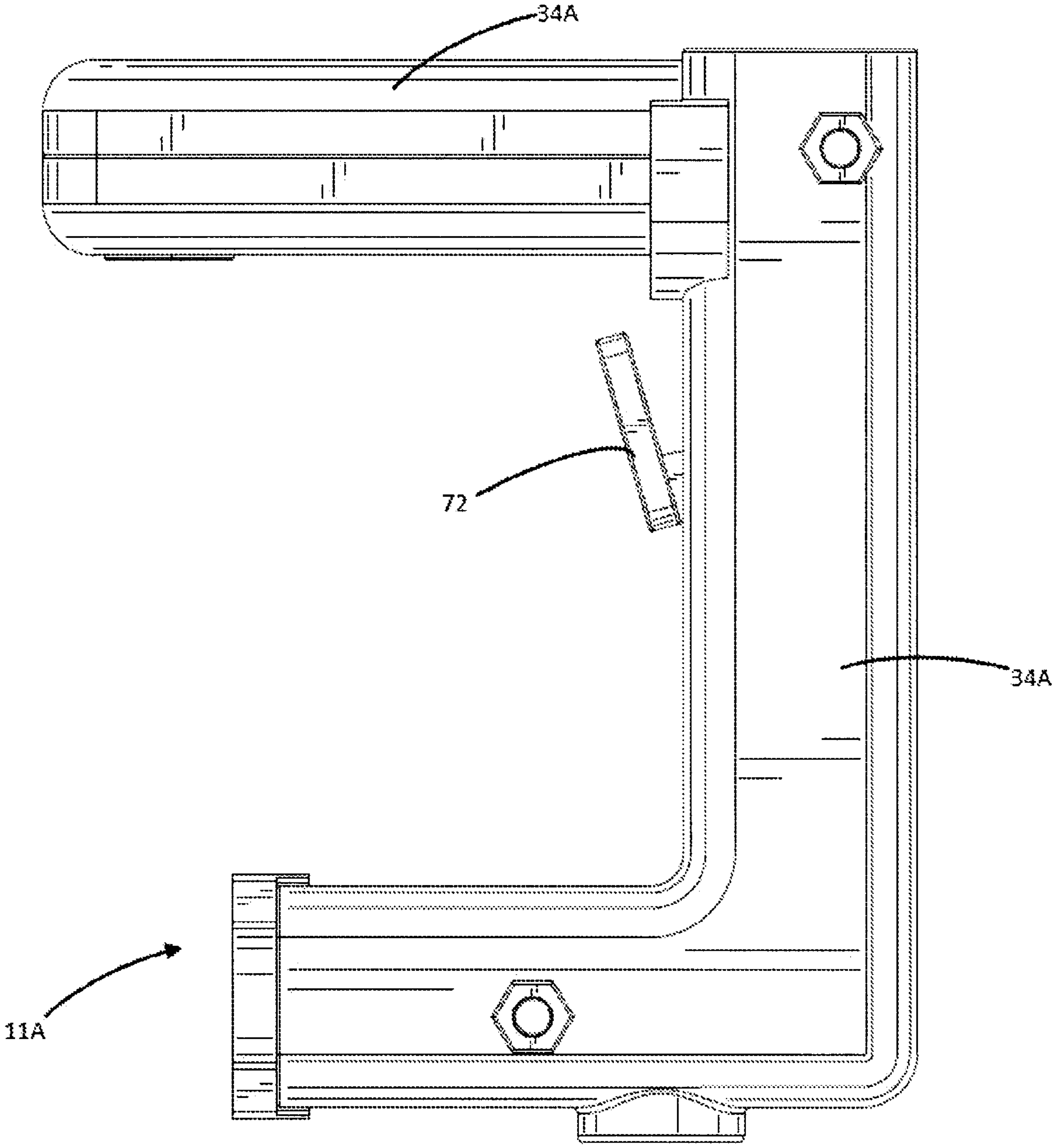
FIG. 17 is a rear view of the handle assembly of FIG. 13.
Figure 18:
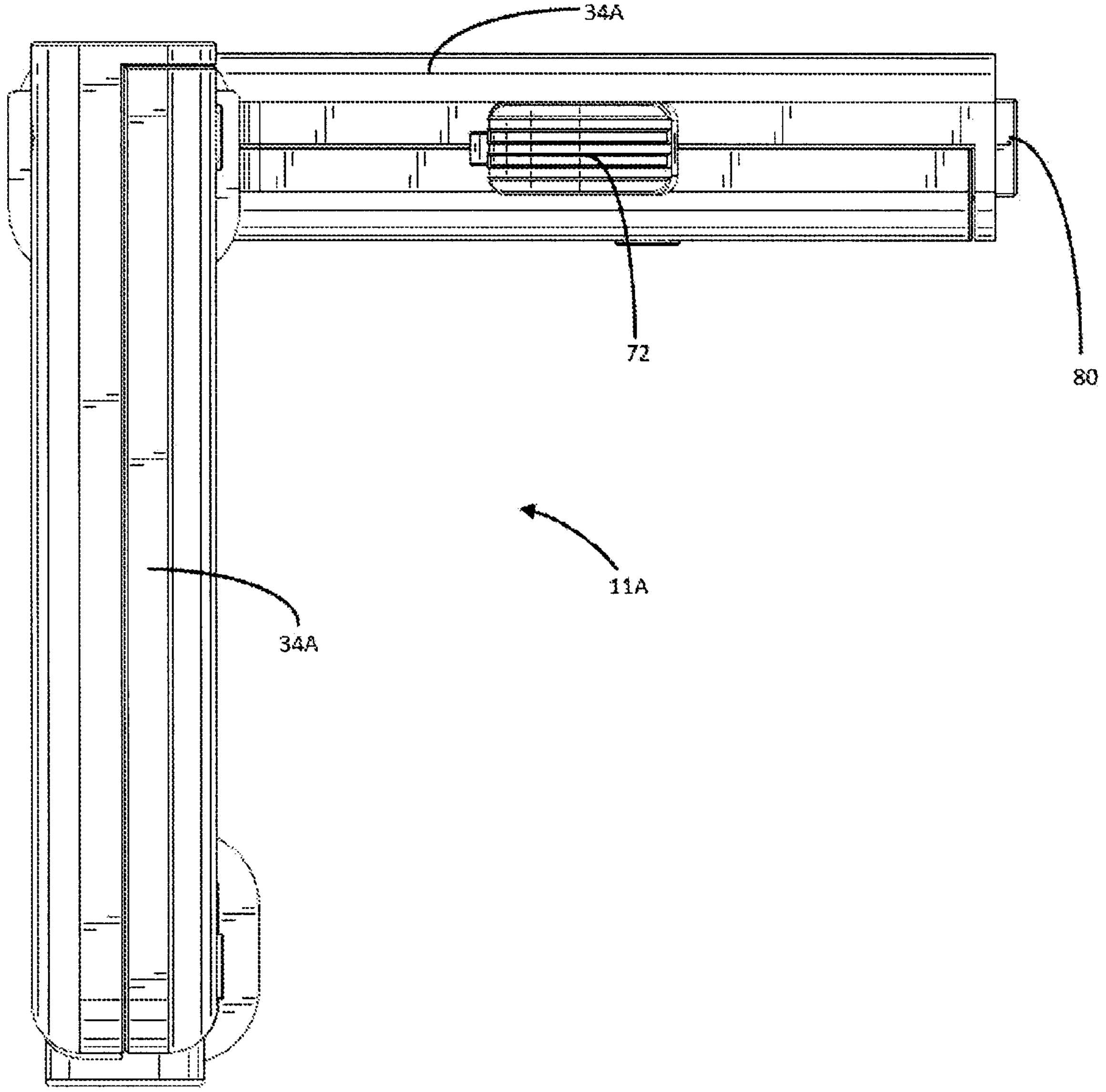
FIG. 18 is one side view of the handle assembly of FIG. 13.
Figure 19:
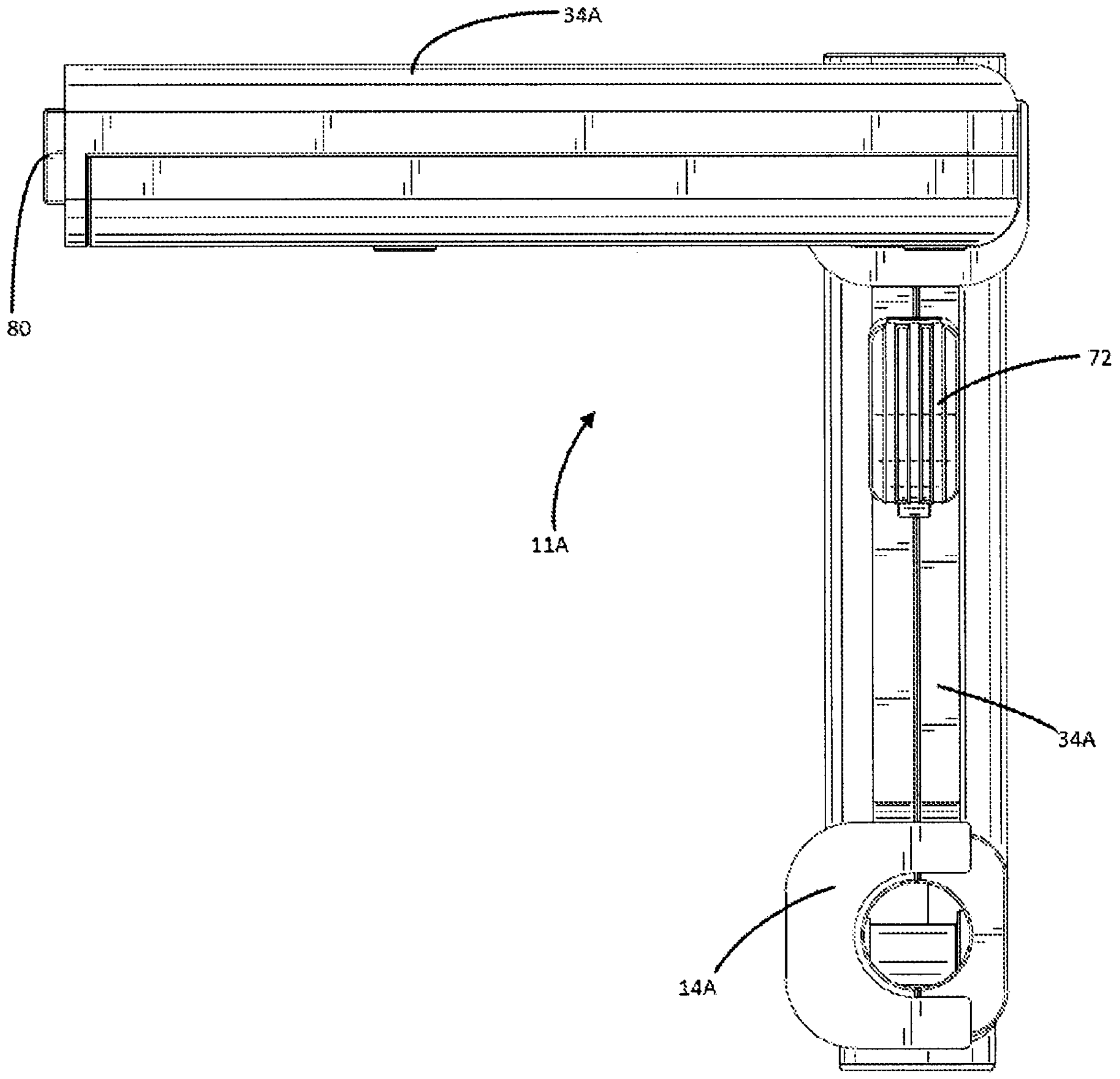
FIG. 19 is an opposite side view of the handle assembly of FIG. 13.
Figure 20:
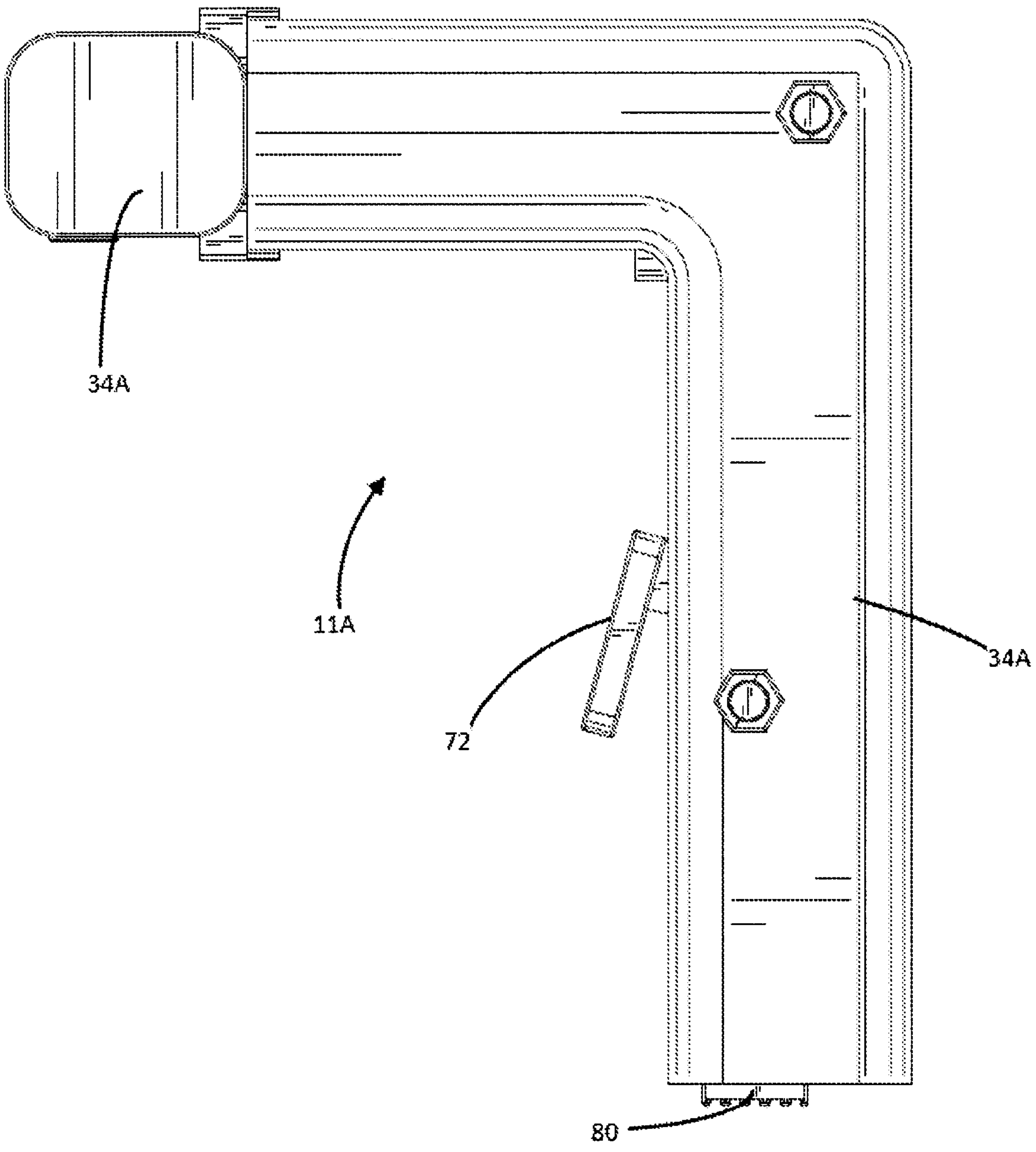
FIG. 20 is a top view of the handy: assembly of FIG. 13.
Figure 21:
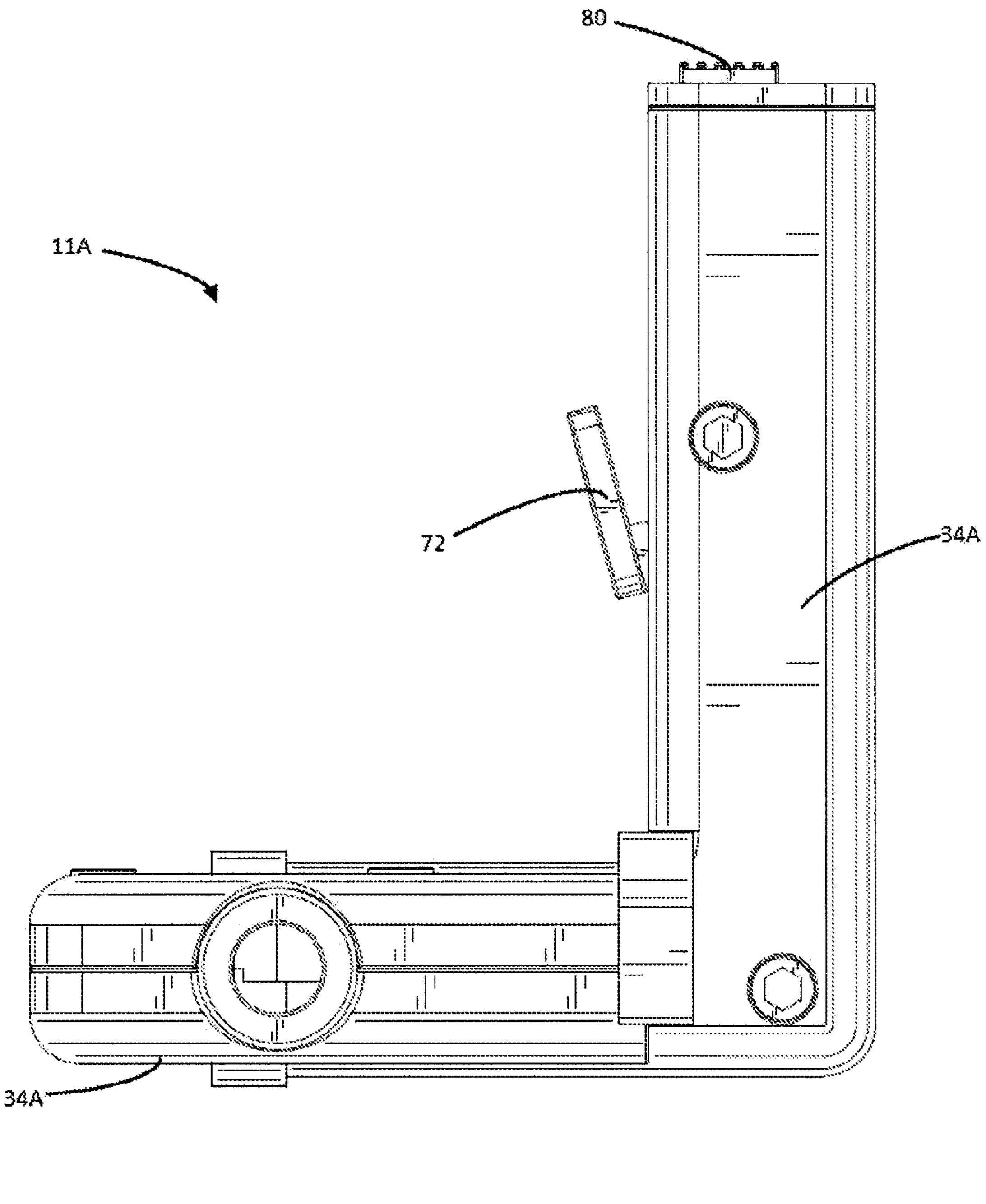
FIG. 21 is a bottom view of the handle assembly of FIG. 13.
Figure 22:
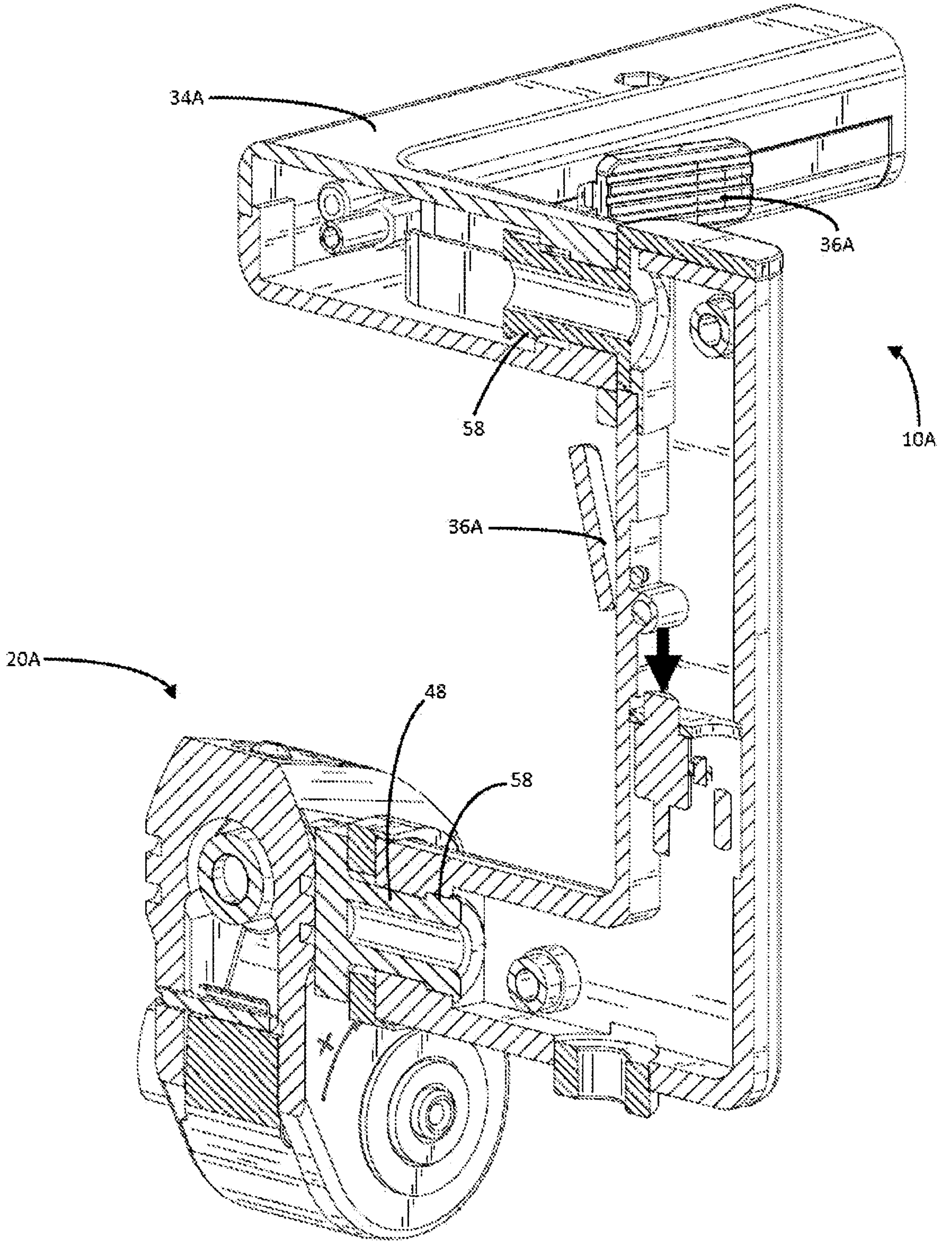
FIG. 22 is a cross-sectional view of the handle assembly of FIG. 13.
Figure 23:
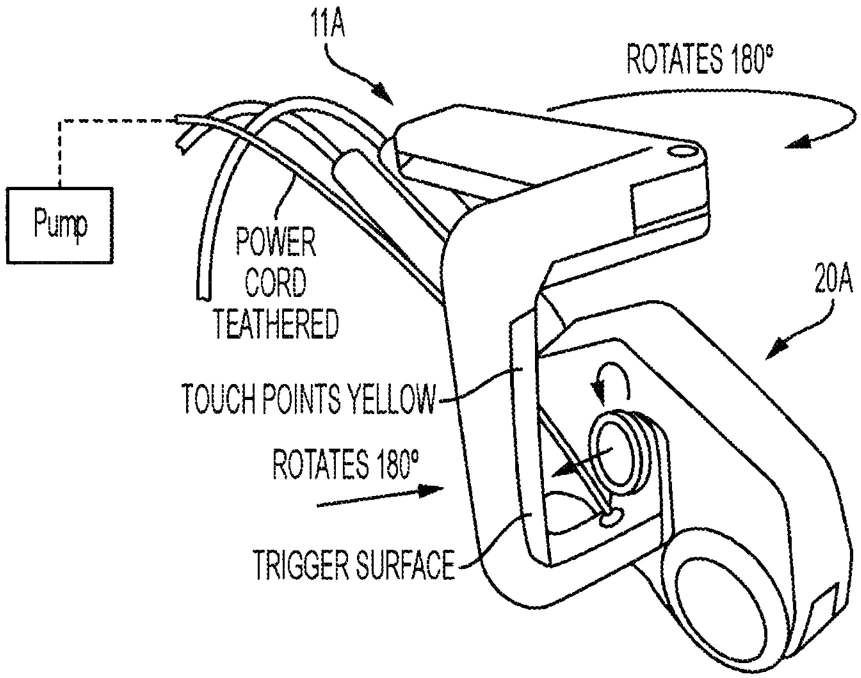
FIG. 23 is a perspective view of another alternative embodiment of a tool, such as a reciprocating piston fluid-operated torque wrench, having integrated controls.
Figure 24:
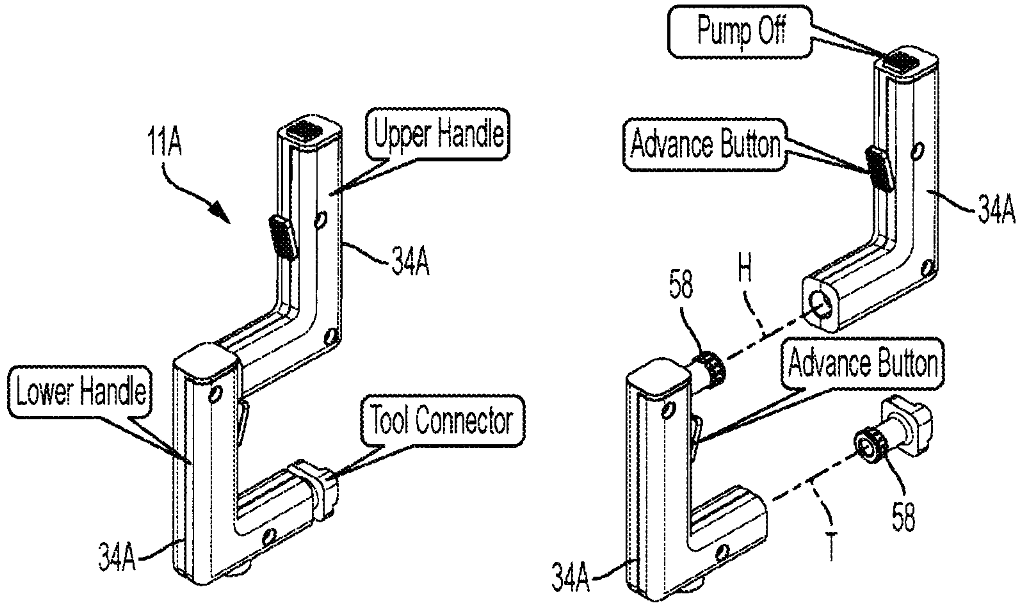
FIG. 24 includes perspective views of the handle assembly of FIG. 8, illustrating assembly and disassembly of the components.
Figure 25A:
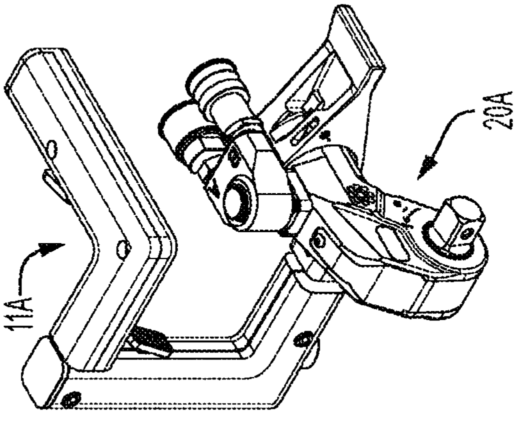
FIGS. 25A-25E are perspective views of the tool and the control assembly of FIG. 8, illustrating different relative pivoted positions of the control assembly and the handle portions.
Figure 25B:
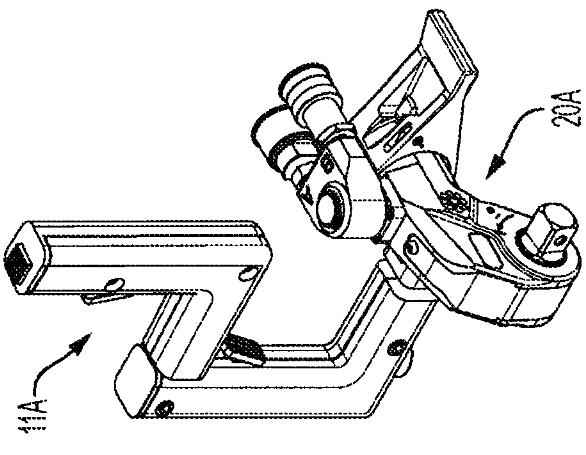
Figure 25C:
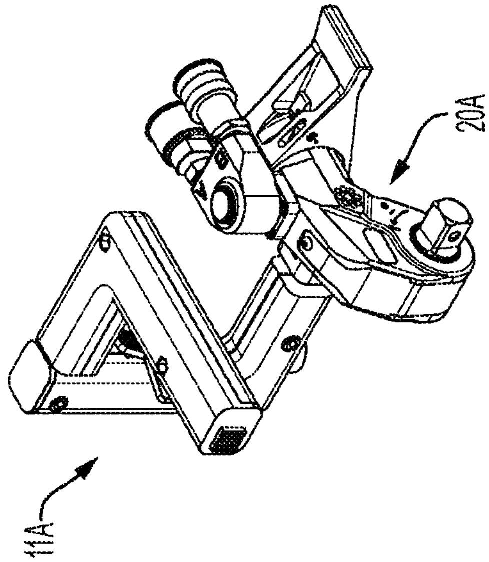
Figure 25D:
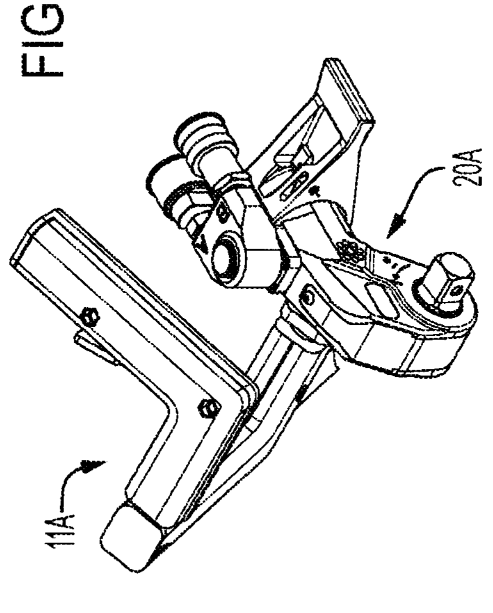
Figure 25E:
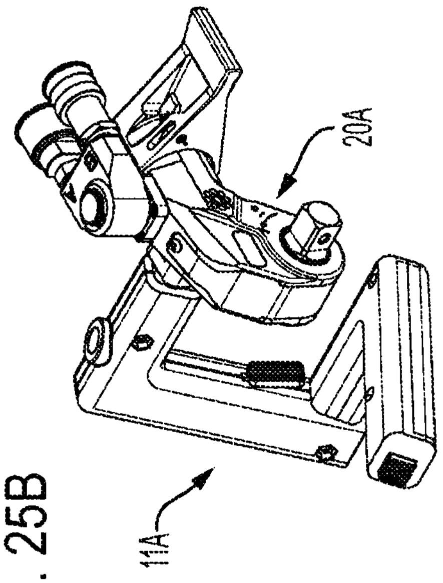
Figure 26A:
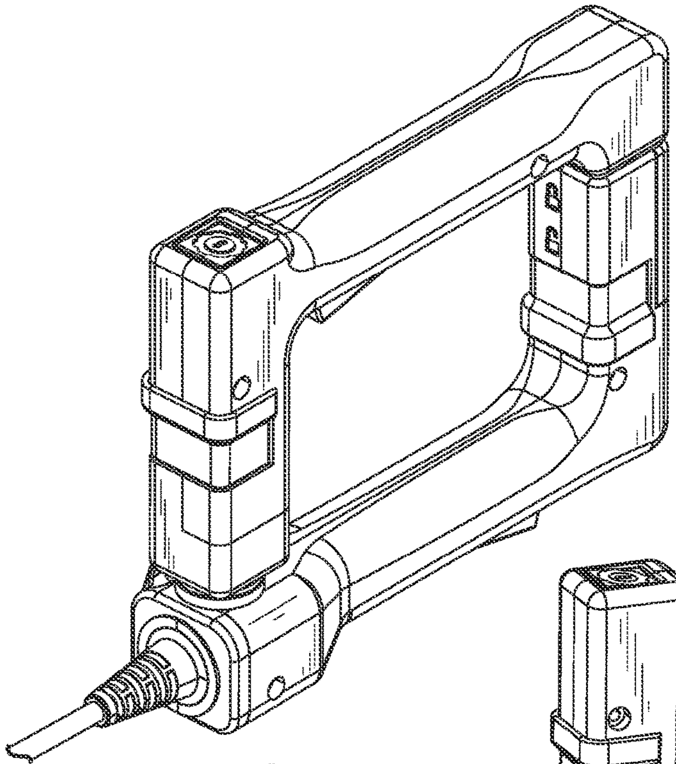
FIGS. 26A-26C are additional views of the tool and the control assembly of FIG. 8, illustrating relative pivoted positions of the control assembly and the handle portions.
Figure 26B:
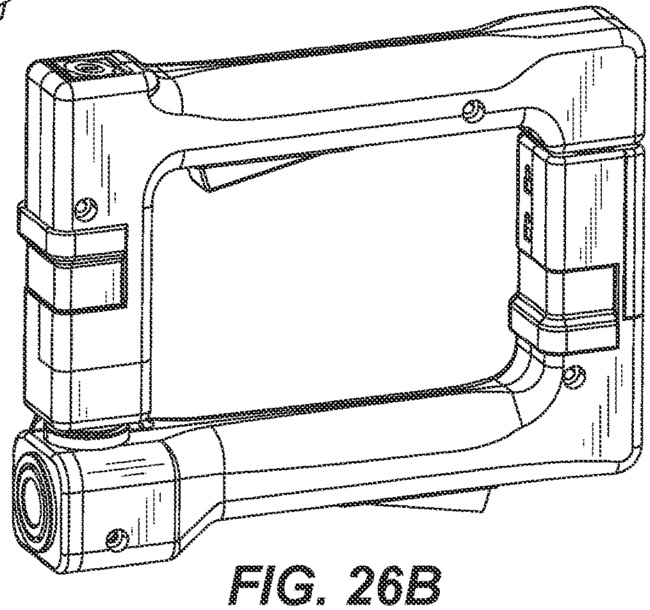
Figure 26C:
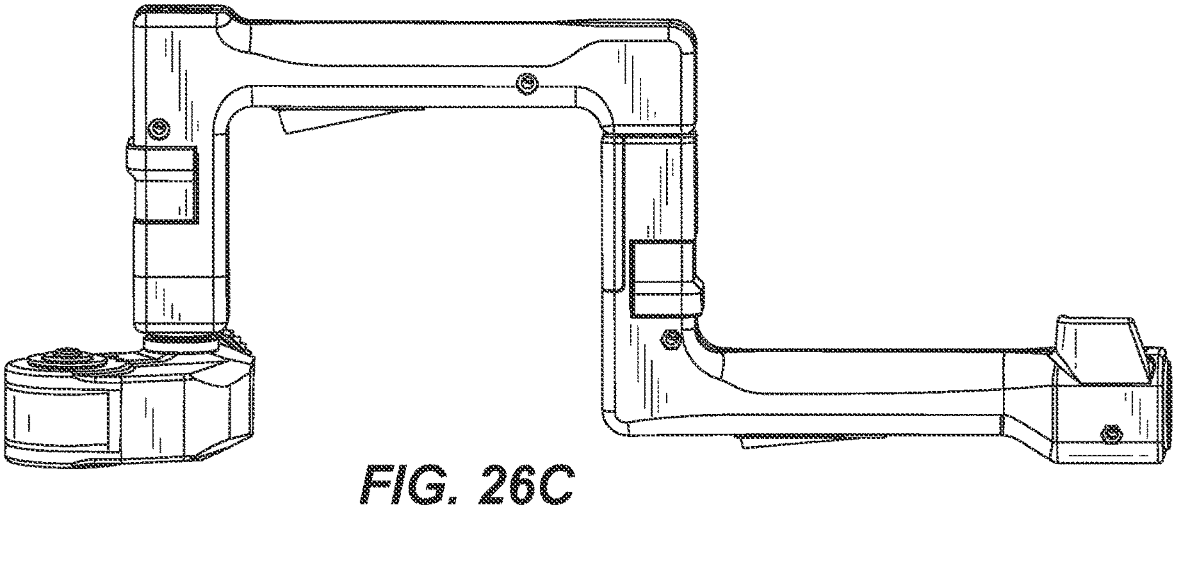
Figure 27A:
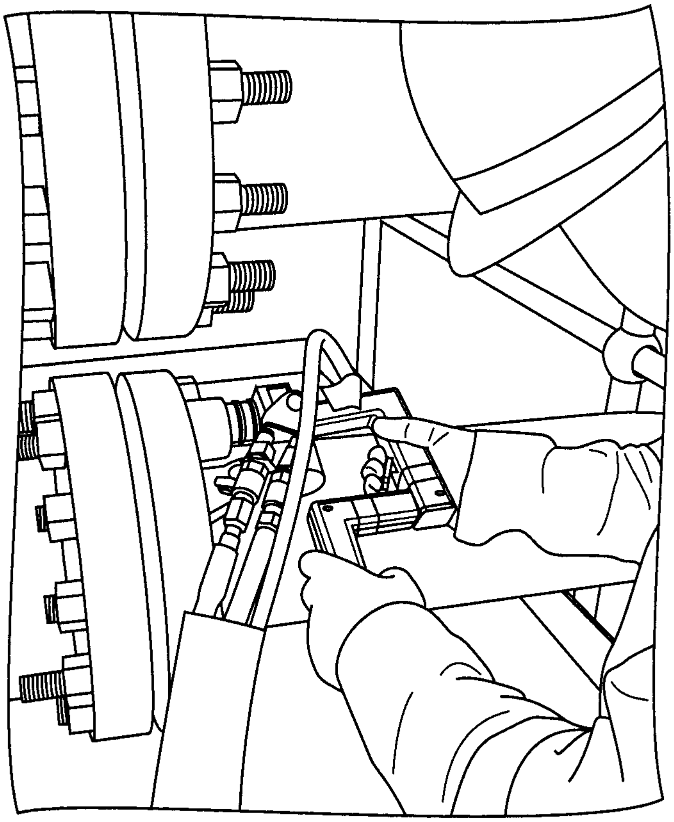
FIGS. 27A-27B are perspective views of the tool and the control assembly of FIG. 8, illustrating the tool and the control assembly in use.
Figure 27B:
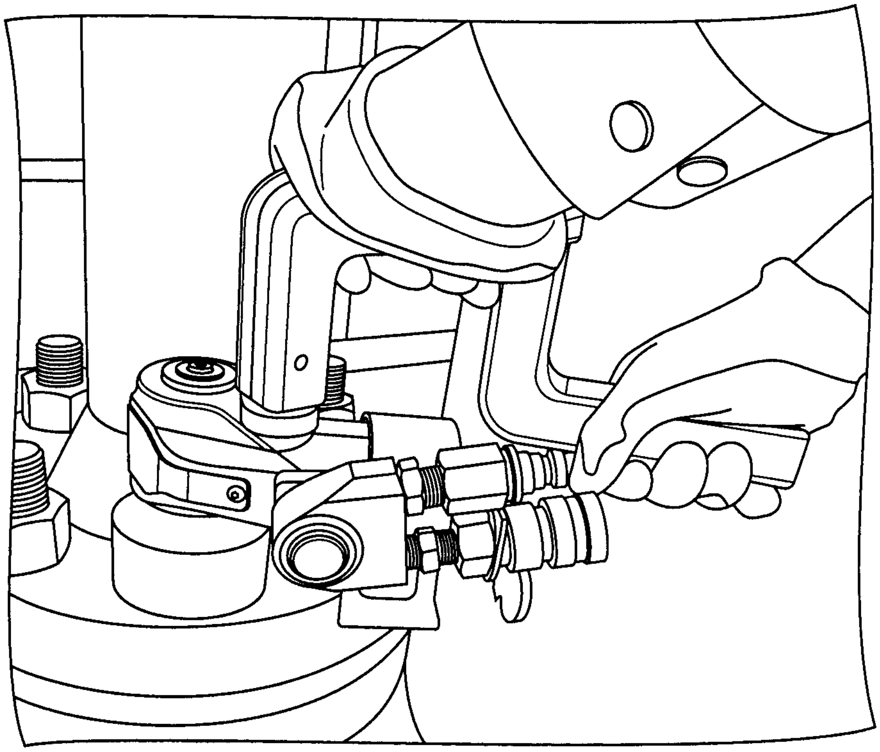

As best illustrated in FIGS. 3 and 6, the pump controls 36 can be positioned between the two handles 34. The pump controls 36 can include one or more actuators or control members. As shown, the illustrated construction includes three buttons 36 one button can be an "ON/OFF" switch to turn the pump on and off, and the other two buttons can be used to control the flow of fluid to the wrench 20. Each button 36 is operable by a digit (e.g., a thumb) on an operator's hand. In the illustrated construction, in order to actuate the wrench 20, two control buttons 36 need to be contacted by the operator. Because each button 36 is operated by an operator's thumb, each of the operator's hands will be on an adjacent handle 34, clear of any pinch points.

The buttons 36 of the illustrated construction are electrically coupled to the pump via wiring (not shown). Wires from the buttons extend through the body 12 to an electrical connection port 38 in the side of body 12. This connection port can be a mounted control cable quick connect. An external wire (not shown) can be connected to the connection port 38 to communicate with the pump. In other constructions (not shown), wireless communication techniques can also be used.

Figure 4:
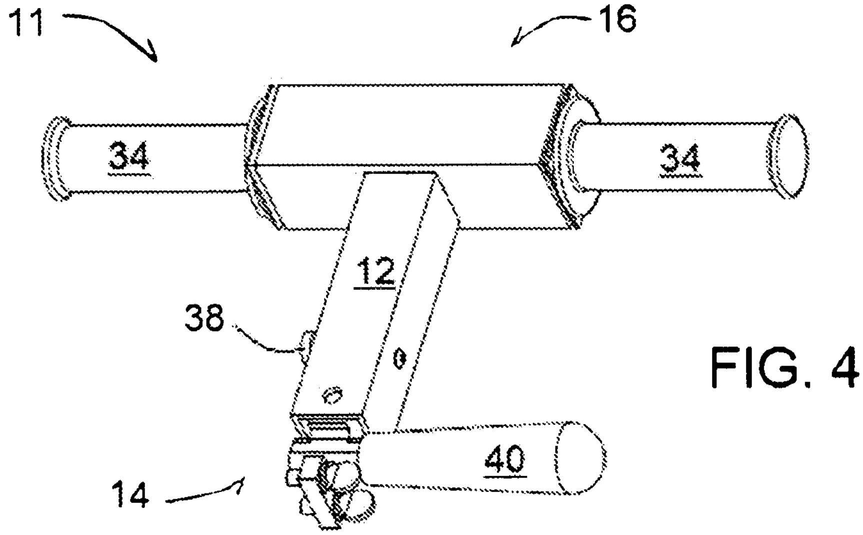
FIG. 4 is a second perspective view of the control assembly of FIG. 1.
Figure 5:
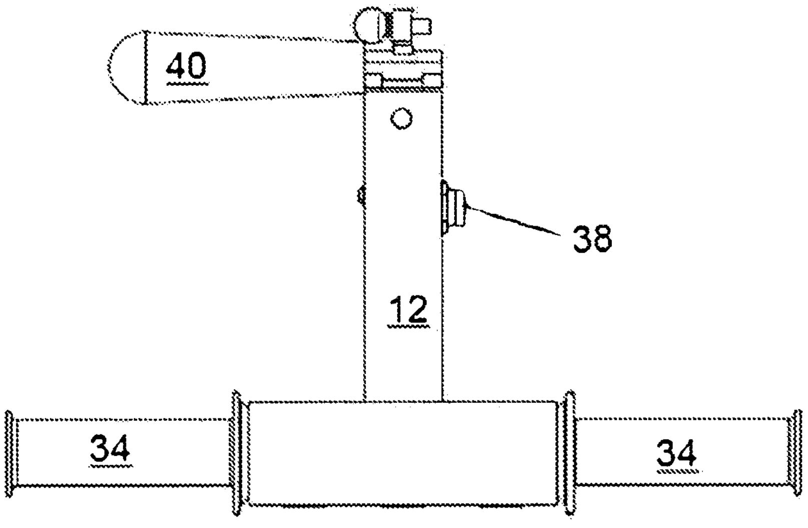
FIG. 5 is a top view of the control assembly of FIG. 1.
Figure 7:
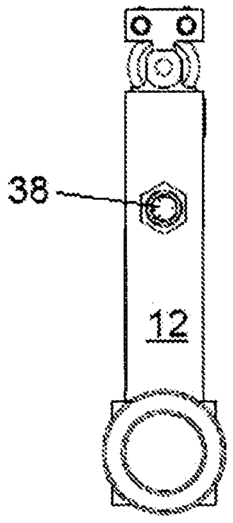
FIG. 7 is a side view of the control assembly of FIG. 1.

As shown in FIGS. 3-5, an additional handle 40 is connected to the body 12 of the control assembly 11. This handle 40 extends in a direction that is generally perpendicular to the axis of rotation of the socket 24. This handle 40 can be used to lift and maneuver the wrench 20 without the need to contact the wrench 20 itself, which may eliminate the opportunity for pinch points between the wrench 20 and the items being fastened.

In operation, the wrench and control assembly 10 can be positioned such that the socket 24 is engaged with a nut to be tightened (or loosened). With respect to the illustrated construction of FIGS. 1 and 2, the operator can manipulate the wrench 20 into position with at least one hand on the positioning handle 40 and the other hand on the body 12 or control handles 34. Once the socket 24 is positioned on a nut, the operator grips each of the handles 34 and, in this position, can then manipulate the buttons 36 to turn and actuate the pump. This will cause the wrench 20 to turn the nut with the wrench 20 reacting off the reaction surface.

In a preferred method of operation, the operator will need to actuate two buttons 36 at the same time—one with each hand—in order for the pump to provide fluid to the wrench 20. Again, this feature ensures that the operator's hands on the handles 34 and free of pinch points prior to operation of the wrench 20 and the pump. This mode of operation is effective with the control assembly 11 attached to the wrench 20 or detached from the wrench 20 due to space constraints of the fastening location.

Once the actuation cycle is complete, the operator can release the actuation button 36 and actuate the "off" button to turn the pump off. The operator then can grasp the positioning handle 40 to lift the wrench 20 off of the nut being operated on and move the wrench to an adjacent nut. The process above then can be repeated.

FIGS. 8-27 illustrate an alternative construction for controls 10A, including a control assembly 11A, for use with a tool, such as a torque wrench 20A. The control assembly 11A is similar to the control assembly 11, shown in FIGS. 1-7 and described above. Common elements have the same reference number "A."

As illustrated (see FIGS. 8-12), the tool includes a piston-style torque wrench 20A. In the illustrated construction, the control assembly 11A is mounted on the wrench 20A (e.g., on a side of the wrench 20A). In other constructions (not shown), the control assembly 114 can be mounted to another surface on the wrench 20A, such as, for example, an end surface, a top surface, etc.

The wrench 20A generally includes a housing 44, a drive mechanism (e.g., a reciprocating piston drive mechanism) supported by the housing 44 and selectively driven by a power source (e.g., a fluid pump), and an output member (e.g., a socket 24A) driven by the drive mechanism. As illustrated, fluid inputs and outputs 22A on the housing 44 connect the torque wrench 20A to the pump. As illustrated, the wrench 20A includes a first end 26A with the socket 24A and a second end 30A with a reaction arm 28A.

In other constructions (not shown), the tool could be another type of fluid-operated tool or a different type of tool powered by a different power source (e.g., an electrical power source (AC or DC (battery)), a fuel power source (gas engine), etc.). Depending on the type of tool, the tool may include a different type of drive mechanism (e.g., a motor, a transmission, etc.) and a different type of output member (e.g., a bit, a blade, a wheel, etc.).

The control assembly 11A has a first end 14A and an opposite, second end 16A and includes a handle assembly with two handle portions 34A. The illustrated control assembly 11A is removably connectable to the housing 44 at the first end 14A. When connected to the wrench 20A, the handle assembly is engageable by an operator to move the wrench 20A relative to a workpiece (e.g., from bolt to bolt on a flange).

As illustrated, each handle portion 34A is generally L-shaped. The handle portions 34A are relatively movable (e.g., pivotable about a handle axis The first handle portion 34A is movably connectable to the housing 44 (e.g., pivotable about a tool axis T). In the illustrated construction, the short leg of the first handle portion 34A defines the axis T and is movably connected to the housing 44, and the short leg of the second handle portion 34A defines the handle axis H and is movably connected to the long leg of the first handle portion 34A. As illustrated, the axes H, T are parallel.

In other constructions (not shown), the axes H, T may have a different orientation (e.g., transverse, perpendicular, etc.

As shown in FIGS. 25A-26C, the handle portions 34A have a range of relative pivoting movement, and the handle assembly has a range of pivoting movement relative to the wrench 20A. In the construction shown in FIGS. 25A-25E, the range is less than 360° (e.g., up to about 180° (as shown (between the positions in FIGS. 25A and 25C)), about 270°, about 300°, or about 320°). In the construction shown in FIGS. 26A-26C, the range is at least 360° (e.g., from the compact position shown in FIGS, 26A-26B, through the extended position shown in FIG. 26C, to the compact position and, potentially beyond the compact position).

The range of movement may be limited by inter-engaging stop surfaces (not shown) on the handle portions 34A or between the handle assembly and the wrench 20A to inhibit relative movement beyond certain pivoted positions (e.g., beyond about 0° or beyond about) 180°. In other constructions (not shown), the range of movement may be greater (e.g., up to about 360° or more).

In other constructions (not shown), the handle portions 34A may have different relative movement (e.g., rotatable or pivotable about a different axis (see FIG. 23) or more than one axis, sliding movement, combinations). For example, the handle portions 34A could be connected with a U-joint type arrangement or a ball joint. As another example, a handle portion 34A can telescope. Likewise, the connection between the handle assembly and the wrench 20A may have different relative movement.

In an alternative construction (see FIG. 23), the L-shaped handle portion(s) 34A can pivot at, the intersection of the legs. The illustrated handle portion can pivot about 180° between opposite L,-shapes through a flattened condition. However, the handle portions 34A can have a range of motion greater than or less than about 180°.

Locking arrangements 52, 56 are disposed between the handle assembly and the wrench 20A and between the handle portions 34A, respectively, to hold the components in selective pivoted positions. Each illustrated locking arrangement 52, 56 includes a positive locking mechanism, such as a detent mechanism with a projection positionable in a selected recess (e.g., recesses provided between teeth 58 on a projection on one handle portion 34A (see FIG. 24)) corresponding to a pivoted position. The projection and recess are biased into engagement (e.g., by a spring). Each locking arrangement 52, 56 may include a frictional locking mechanism, such as a clamp. Each locking arrangement 52, 56 may include a combination positive and frictional locking arrangement.

A connection assembly 48 releasably connects the handle assembly to the wrench 20A. As illustrated, the connection assembly 48 includes an adapter 60 connectable between the wrench 20A and the handle assembly; however, in an alternative construction (not shown), the handle assembly may be directly connected to the housing 44. The adapter 60 includes a connector 64 connectable to the housing 44. The connector 64 may provide a threaded connection (e.g., a threaded shaft threadedly engaging a threaded bore on the housing 44), an interference fit, a bayonet connection, etc. A reaction surface may be provided between the adapter 60 and the housing 44.

The adapter 60 includes a connector 68 connectable to the handle assembly. A quick release mechanism on the handle assembly may engage the connector 68. For example, the connector 68 may include an annular groove 70 and the handle assembly may include a movable collar engageable in the groove. The collar may slide laterally at the first end 14A of the handle portion 34A to unblock a bore in the first end 14A, and after the adapter connector 68 is inserted, the collar moves to engage the groove and block the end of the bore. The removal process is reversed. In other constructions (not shown), the connector 68 may provide a different type of connection with the handle assembly, such as, for example, a different quick connection, a threaded connection, an interference fit, a bayonet connection, etc.

In the illustrated construction, pivoting movement between the handle assembly and the wrench 20A is accommodated by the adapter 60 (e.g., the pivoting movement is between the handle assembly and the connector 68 of the adapter 60). As illustrated, the adapter 60 allows the handle assembly to pivot about the axis T that extends through the center of the adapter 60. The locking arrangement 52 is provided between the handle assembly and the adapter connector 68 (e.g., a projection selectively engageable in a recess between teeth 58 on the connector 68 (see FIG. 12). In other constructions (not shown), the adapter 60 may accommodate other types of movement with the handle assembly (e.g., rotation or pivoting about a different axis or more than one axis, sliding movement, etc.

The control assembly 11A further includes pump controls 36A disposed on the handle portions 34A. In the illustrated construction, a pump control 36A is supported on each handle portion 34A and positioned to be engaged by one or more digits on a separate hand of an operator in order to operate the pump. The pump controls 36A are positioned on the control assembly 11A such that both pump controls 36A cannot be operated by only one hand. The pump controls 36A thus operate to sense one hand of the operator on one handle portion 34A and the other hand of the operator on the other handle portion 34A.

The pump controls 36A control the pump to drive the drive mechanism and thereby the output member (the socket 24). The pump controls 36A are in communication with the pump when the handle assembly is connected to the housing 44 and when the handle assembly is disconnected from the housing 44. The pump is operable under the control of the pump controls 36A when the handle assembly is connected to the housing 44 and when the handle assembly is disconnected from the housing 44.

Each pump control 36A includes (see FIG. 22) a switch and an actuator engagable by the operator to operate the switch. As an actuator, a pump control 36A includes a button, a lever (as shown), a trigger, a sensor (e.g., pressure, force, displacement, capacitive touch, etc.), etc. The pump controls 36A send control signals to the pump, and the type of control signals depends on, for example, the switch, the power source (e.g., the pump), the drive mechanism of the wrench 20A, relative movement between the components (e.g., between the handle assembly and the wrench 20A, between the handle portions 34A and the supported switches), etc.

In some constructions (see FIGS. 8-11), the control signals include pneumatic signals, and each switch of a pump control 36A includes an air switch. A conduit 76 (e.g., a 4 mm hose) communicates the signals from the control assembly 11A to the pump.

In other constructions (see FIG. 23), the control signals include electrical signals, and each switch of a pump control 36A includes an electrical switch in communication with the pump. Communication of the control signals from the control assembly 11A to the pump is provided by an electrical conductor (e.g., one or more wires (as shown), a sliding electrical contact, etc.). In other constructions, communication may be wireless, and the control assembly 11A may include a wireless interface.

The illustrated pump controls 36A include two operation levers 72 (e.g., advance controls) and a reset button 80 (e.g., a pump ON/OFF). Each handle portion 34A includes one lever 72, and the levers 72 are operable through the switches to actuate the pump. As shown, the levers 72 are arranged on the handle assembly such that, in the different pivoted positions of the handle portions 34A, the levers 72 cannot both be actuated with one hand of the operator. The illustrated levers 72 are arranged in parallel planes. The reset button 80 is operable to reset the pump and is positioned on the free end of the handle assembly.

FIGS, 28-37 illustrate another alternative construction for controls 1013, including a control assembly 111B for use with a tool, such as a piston-style torque wrench 20B. The control assembly 11B is similar to the control assembly 11 shown in FIGS. 1-7, and the control assembly 11A, shown in FIGS. 8-27, and described above. Common elements have the same reference number "B" or "B#", with "#" representing the number of a sub-element of the common element.

Figure 28:
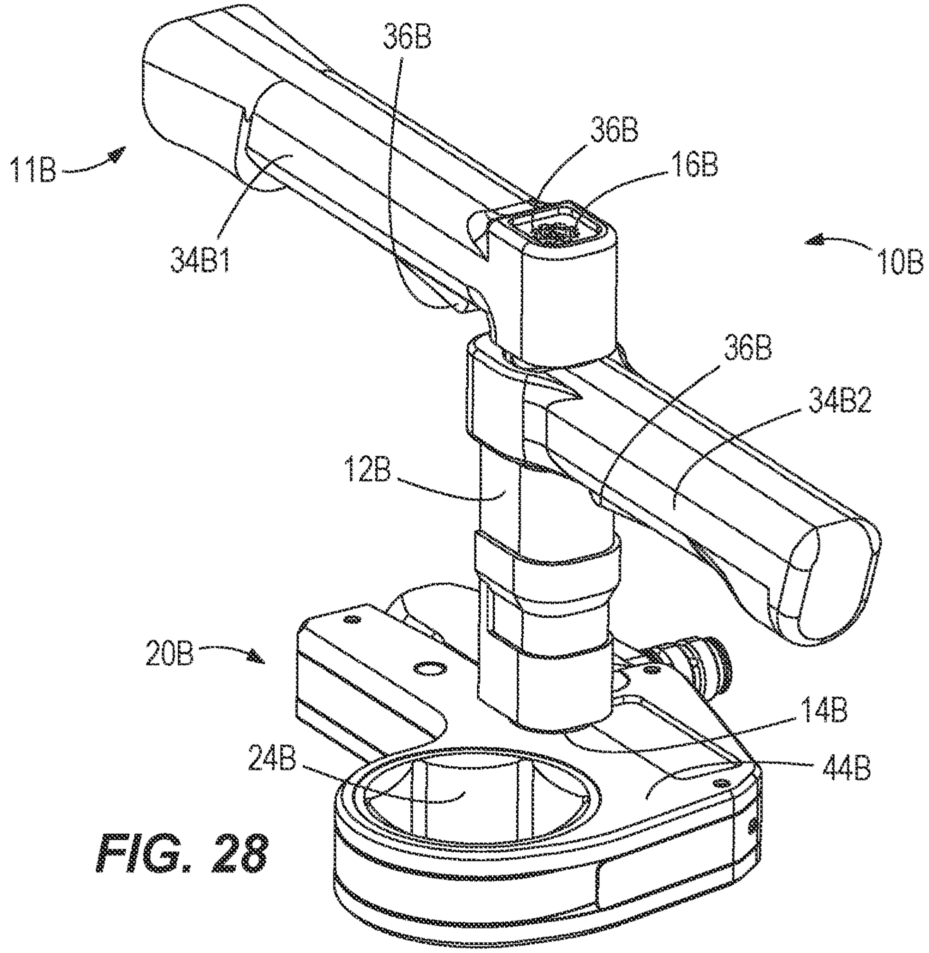
FIG. 28 is a perspective view of an alternative embodiment of a tool, such as a reciprocating piston fluid-operated torque wrench, having integrated controls.
Figure 29:
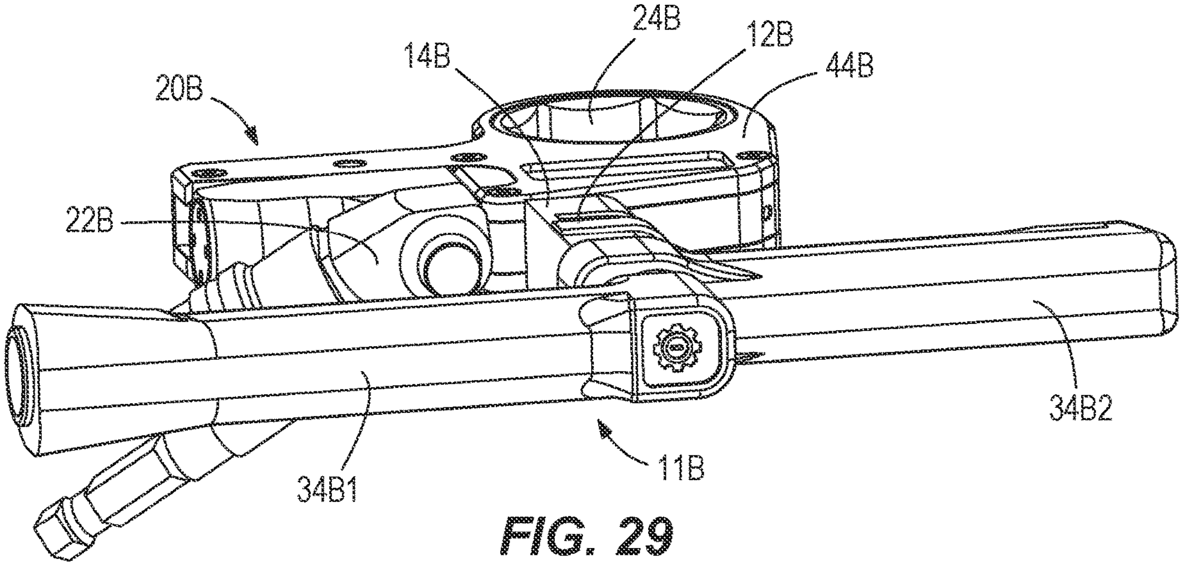
FIG. 29 is another perspective view of the tool and the control assembly of FIG. 28, with the control assembly on a side of the tool.
Figure 30:
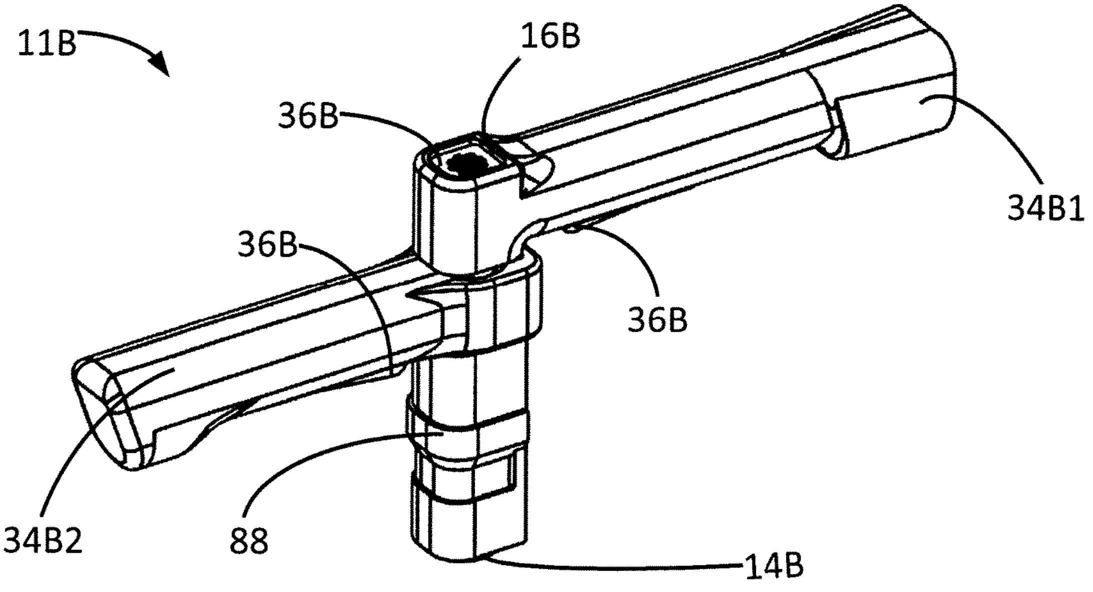
FIG. 30 is a perspective view of the handle assembly of the control assembly of FIG. 28.
Figure 31:
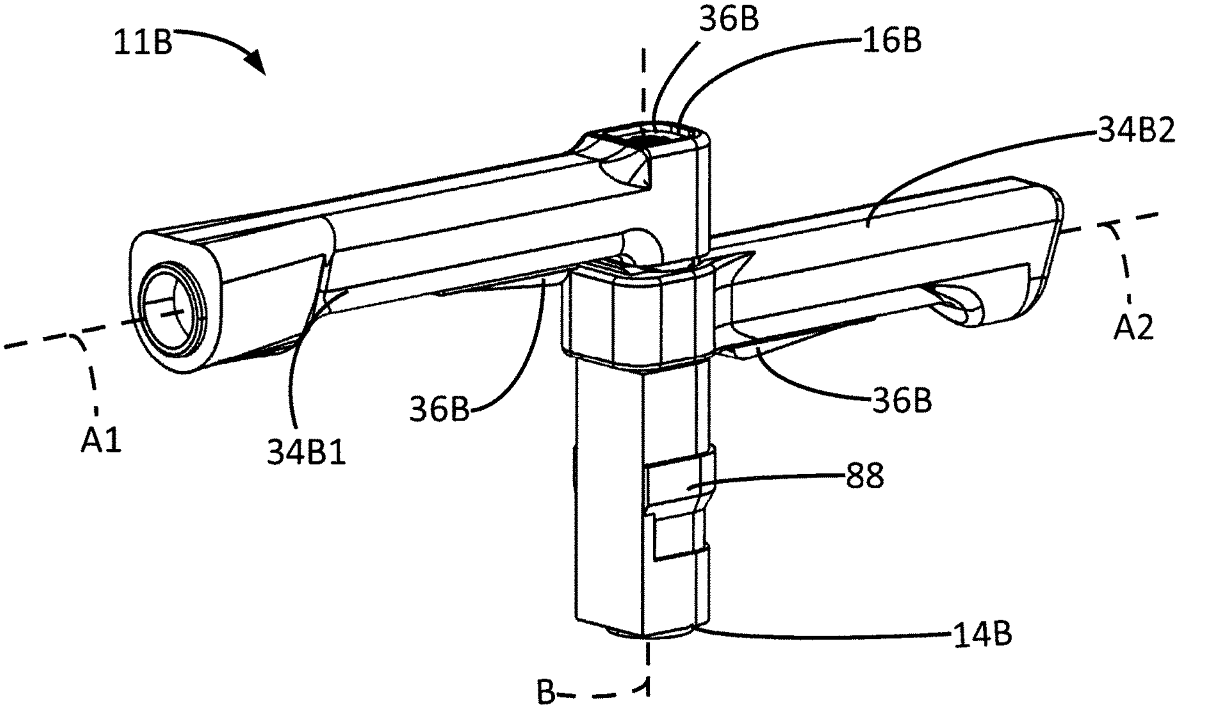
FIG. 31 is another perspective view of the handle assembly of FIG. 30.
Figure 37:
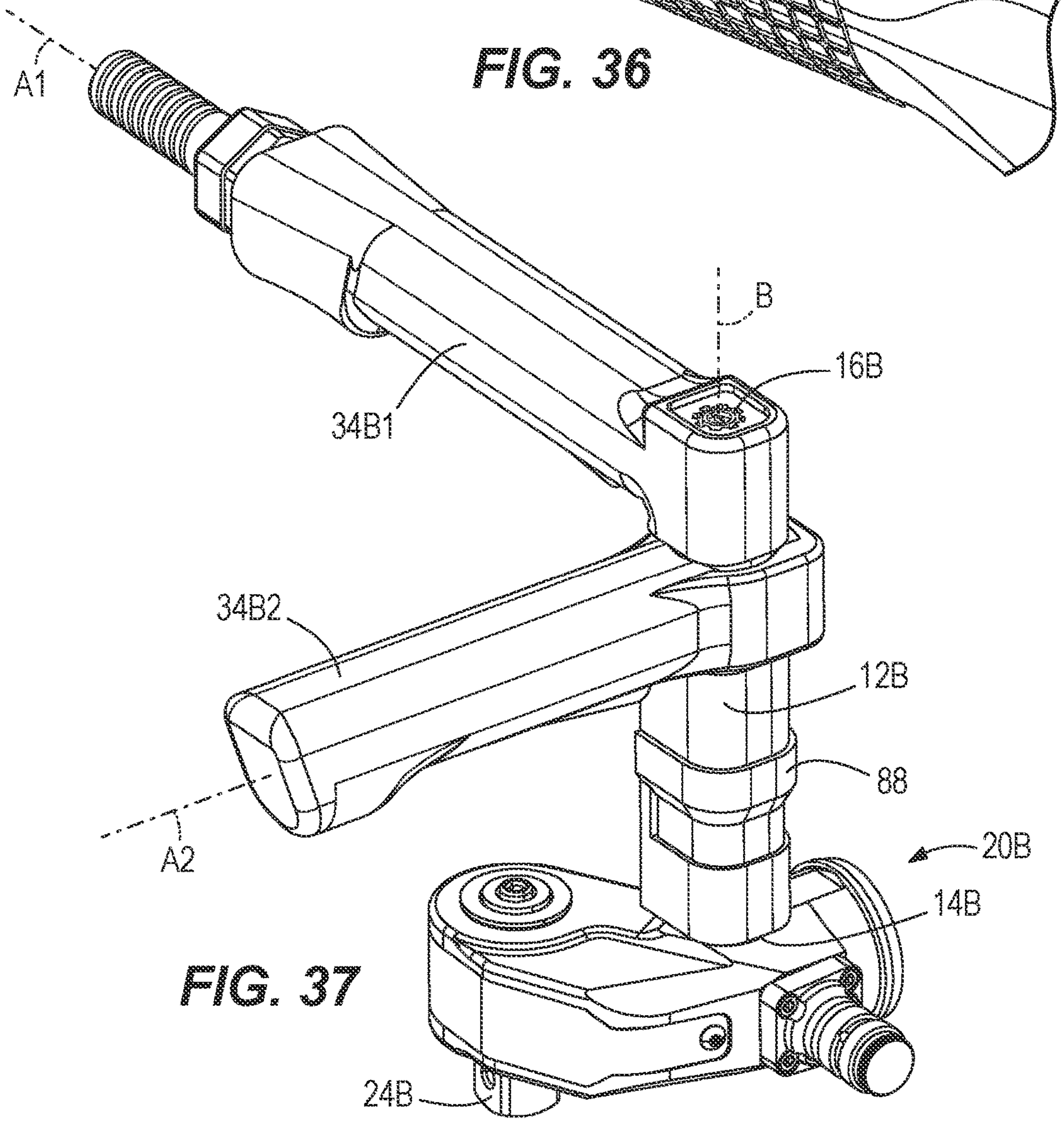
FIG. 37 is a perspective view of an alternative embodiment of a tool, such as a reciprocating piston fluid-operated torque wrench, having integrated controls and the handle assembly of FIG. 30.
Figure 38:
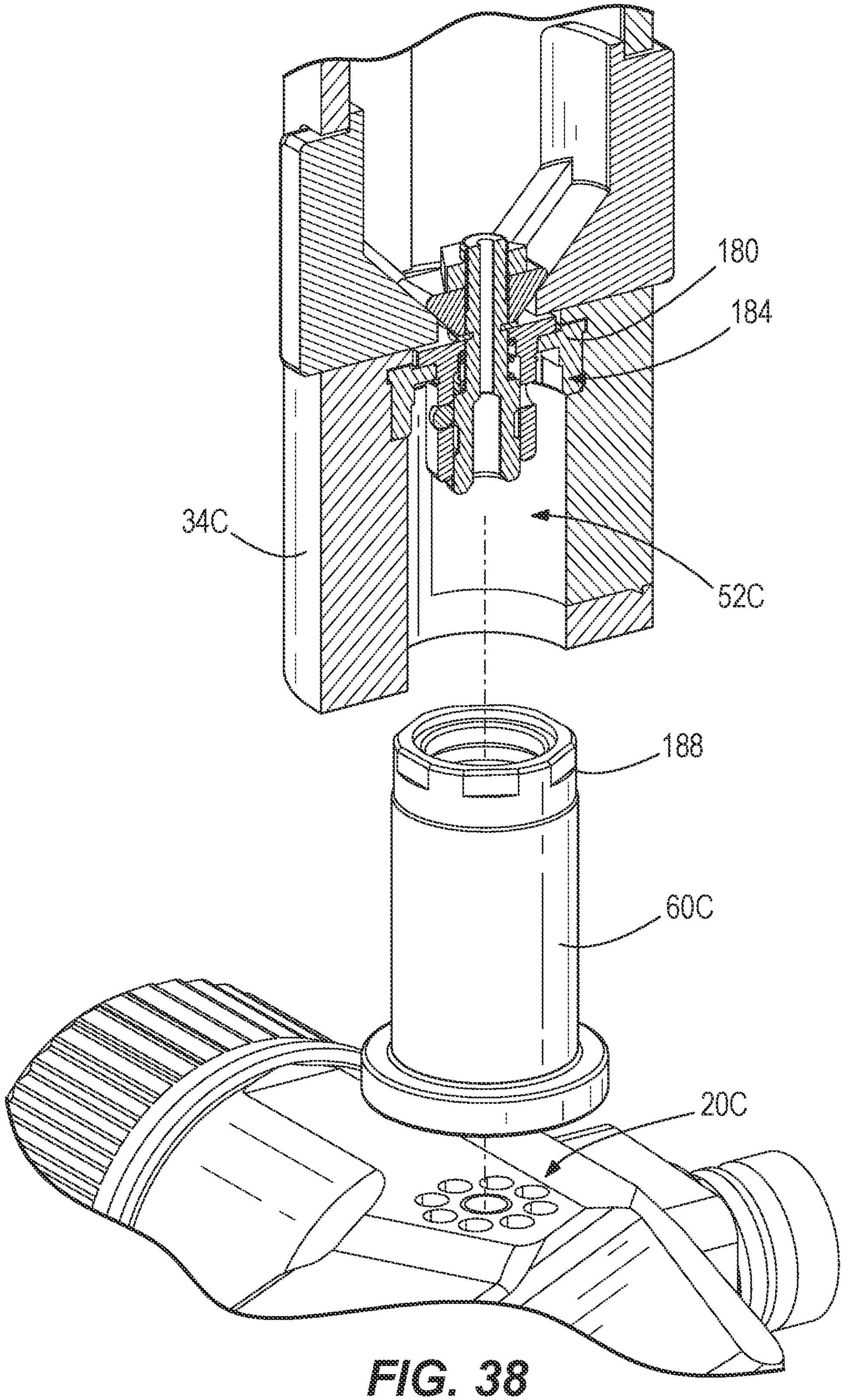
FIG. 38 is a perspective view of a portion of another alternative embodiment of a tool, such as a reciprocating piston fluid-operated torque wrench, having integrated controls, illustrating a handle assembly disconnected from the tool.

The control assembly 11B can be used with a variety of tools such as, for example, a low-profile torque wrench 20B (see FIGS. 28-29) or a square-drive torque wrench 20B (see FIG. 37). In the illustrated construction, the control assembly 11B is mounted on the tool (ect. on a side of the wrench 20B (see FIG. 28), on a top surface of the wrench 20B (see FIG. 29), etc.).

With reference to FIGS. 30-35, the control assembly 11B includes a main body 12B extending along a body axis B and having a first end 14B coupled to the wrench 20B and an opposite, second end 16B. The control assembly 11B also includes a handle assembly with a first handle portion 34B1 and a second handle portion 34B2. In the illustrated construction, the control assembly 11B is removably connectable to the housing 44B at the first end 1413, and the body 12B is adjustable (e.g., pivotable about is axis B) relative to the housing 44B. When connected to the wrench 20B, the handle assembly is engageable by an operator to move the wrench 20B relative to a workpiece (e.g., from bolt to bolt on a flange).

As illustrated, each handle portion 34B extends from the body 12B proximate the second end 16B. In the illustrated construction, the first handle portion 34B1 is adjacent the second end 16B, and the second handle portion 34B2 is spaced inwardly of the first handle portion 34B1. The first handle portion 34B1 is elongated along and defines a first axis A1, and the second handle portion 34B2 is elongated along and defines a second axis A2. In the illustrated construction, the first axis A1is in a plane parallel to and offset from the second axis A2, and each axis A1, A2 is substantially perpendicular to the body axis B.

The handle portions 34B are relatively adjustable (e.g., movable, pivotable), and at least one handle portion 34B1, 34B2 is adjustable (e.g., movable, pivotable) relative to the body 12B. In the illustrated construction, the second handle portion 34132 is pivotable relative to the body 12B (e.g., about the body axis B), and the first handle portion 34B1 is fixed to the body 12B (e.g., formed integrally, converging with the body 12B at its second end 16B (as shown)). The second handle portion 34B2 is pivotable (see FIG. 34) between a plurality of positions relative to the body 12B and to the first handle portion 34B1. The pump is operable with the second handle portion 34B2 in any of the pivoted positions.

In other constructions (not shown), the first handle portion 34B1 may be separate from and coupled to the body 12B (in a fixed or movable configuration). In some constructions (not shown), the first handle portion 34B1 is movable relative to the body 12B (e.g., pivotable about the body axis B). In some constructions (not shown), rather than the first handle portion 34B1, the second handle portion 34B2 is fixed relative to the body 12B.

Figure 34:
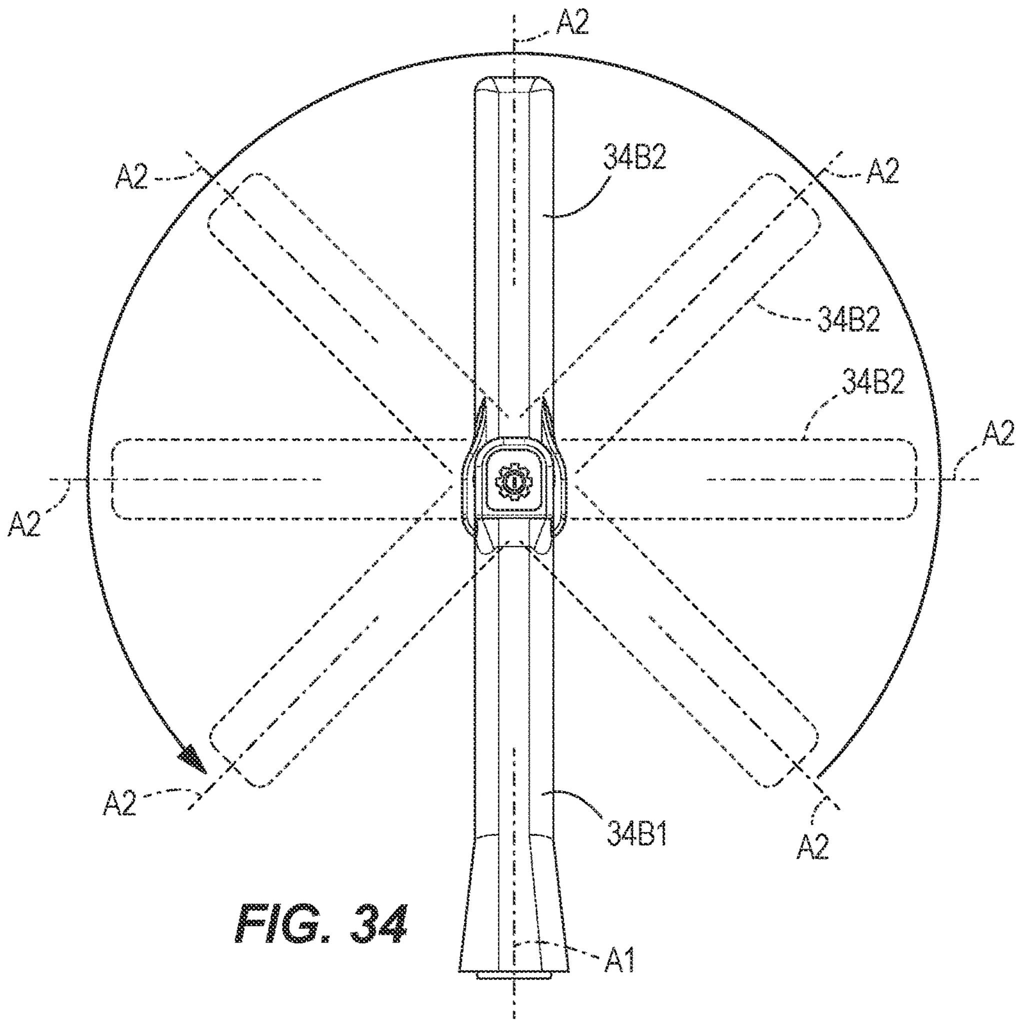
FIG. 34 is a schematic view of the handle assembly of FIG. 30 illustrating different pivoted positions of one of the handle portions.
Figure 35:
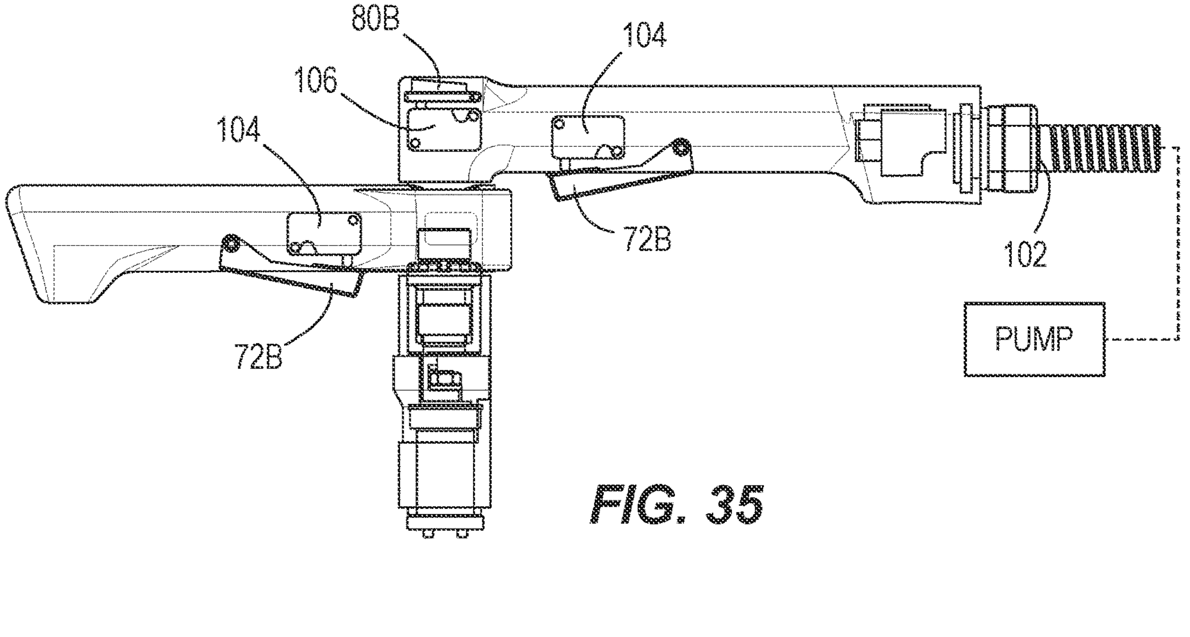
FIG. 35 is a schematic view of the interior of the handle assembly of FIG. 30.
Figure 36:
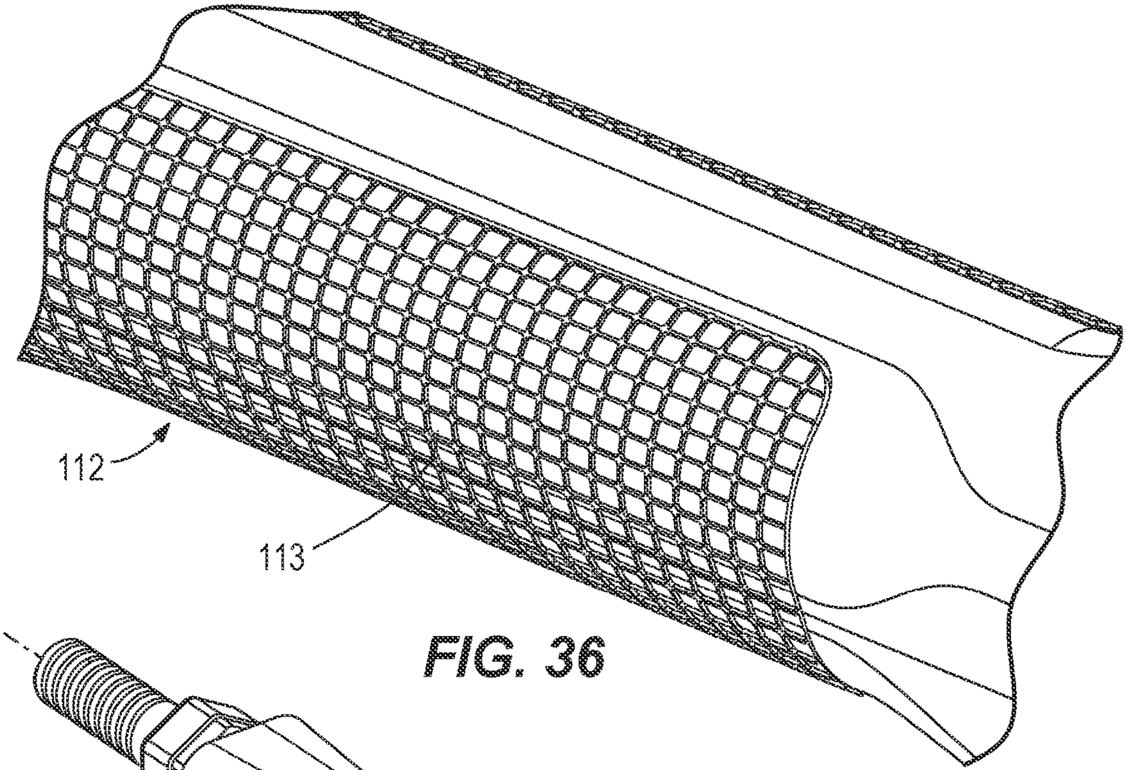
FIG. 36 is an enlarged view of the handle assembly of FIG. 30.

As shown in FIGS. 28-32, the second handle portion 34B2 can be positioned so that the first axis A1 is parallel to the second axis A2. As shown in FIG. 34, when viewed along the body axis B, the second axis A2 forms an angle with the first axis A1, and the second handle portion 34B2 has a range of pivoting movement relative to the first handle portion 34B1. In the illustrated construction, the range is less than 360° (e.g., up to about 180°, about 270° (as shown), about 300°, or about 320°). As shown, the minimum angle between the first axis A1 and the second axis A2 is at least 30° (e.g., at least 45° (as shown), at least 60°, or at least 90°. The range of movement may be limited by inter-engaging stop surfaces (not shown) on the second handle portion 34B2 and another structure (e.g., on the body 12B, the first handle portion 34B1). The limited range may inhibit overlap of the handle portions 34B, accidental trigger actuation, pinching, etc.; however, in other constructions (not shown), the range may be 360° or more.

In other constructions (not shown), the handle portions 34B may have different relative movement (;e.g., rotatable or pivotable about a different axis or more than one axis, sliding movement, combinations). For example, the handle portions 34B could be connected to each other or to the body 12B with a U-joint type arrangement or a ball joint. As another example, one of the handle portions 34B can telescope.

Likewise, the connection between the control assembly 11B and the wrench 20B may have different relative movement. In the illustrated construction, the body 12B is pivotable about the body axis B to adjust the position of the first handle portion 34B1 relative to the housing 44B. In other constructions (not shown), when connected, the body 12B of the control assembly 11B may be fixed relative to the wrench 20B.

Locking arrangements 52B, 56B are disposed between the control assembly 11B and the wrench 20B and between the movable handle portion(s) (e.g., the handle portion 34B2) and another structure (e.g., the body 12B), respectively, to hold the components in selective adjusted positions.

In the illustrated construction, the second handle portion 34B2 is held in a position via a friction fit between the second handle portion 34B2 and the body 12B. Optionally (and as illustrated), the handle locking arrangement 56B also includes a positive locking mechanism to provide a combination positive and frictional locking arrangement. In other constructions (not shown), the locking assembly may include, additionally or alternatively, a different type of locking mechanism, such as, for example, a clamping mechanism.

The positive locking mechanism includes a detent mechanism with a projection on the handle portion 34B2 positionable in a selected recess (e.g., recesses provided between teeth) on the on the body 12B, in corresponding to a pivoted position. A lock actuator 84 on the handle portion 34B2 may be actuated by the operator to engage and/or disengage the positive lock. The positive lock (e.g., the actuator 84) may be biased to a position (e.g., the disengaged position) and held by the operator in the other position (e.g., the engaged position).

As mentioned above, the control assembly 11B is removably coupled from the wrench 2013. An attachment collar 88 is operable to selectively retain the control assembly 11B on housing 44B of the wrench 20B. The collar 88 is disposed on the body 12B adjacent the first end 1413 of the body 12B and is movable relative to the body 12B (e.g, slidable along (as shown)/pivotable about the body axis B of the body 12B, removable from the body 12B, etc.) between a retaining position and a release position. As positioned, the collar 88 can be engaged by an operator's left of right hand.

In the retaining position, the collar 88 covers an aperture 92 adjacent the first end 14B of the body 12B and, in the release position, uncovers the aperture 92. The body 12B also defines an opening 96 communicating with the aperture 92 and a flange 100 extending into the opening 96.

The wrench 20B includes an attachment portion (not shown) having a flange. The wrench attachment portion slides into the opening 96 of handle assembly 11B via the aperture . Thereafter, the attachment collar 88 closes the aperture 92 to prevent the attachment portion from moving out of the opening 96 via the aperture 92 while the flange 100 prevents the attachment portion from moving out of the opening 96 along the body axis B.

The connection arrangement between the control assembly 11B and the wrench 20B also provides the locking arrangement 52B. As the control assembly 11B is installed on the wrench 20B, a projection (not shown) on the body 12B in the opening 96 is positionable in a selected recess (e.g., recesses provided between teeth)) on the attachment portion of the wrench 20B. Engagement of the projection and recess holds the control assembly 11B in a pivoted orientation relative to the wrench 20B.

In the illustrated construction, the control assembly 11B is supportable on the wrench 2013 with the handle portion 34B1 oriented in a limited number of positions (e.g., 0°, 90°, 180°, 270°). In other constructions, the control assembly 11B may be supportable in fewer or more relative positions.

With reference to FIGS. 30-33 and 35, the control assembly 11B further includes pump controls 36B disposed on the handle portions 34B. In the illustrated construction, one pump control 36B is supported on the first handle portion 3431, and another pump control 36B is supported on the second handle portion 34B2. The pump controls 36B are positioned on the handle portions 34B so that more than one pump control 36B cannot be operated by only one hand. The pump controls 36B operate to sense a first hand of the operator on the first handle portion 34B1 and a second hand of the operator on the second handle portion 34B2.

In the illustrated construction, another pump control 36B (e.g., a pump ON/OFF control) is supported on the second end 16B of the body 12B. The pump controls 36B control the pump to drive the drive mechanism and thereby, the output member, or the socket 24B. When the control assembly 11B is connected to the housing 44B and when the control assembly 11B is disconnected from the housing 44B, the pump controls 36B are in communication with the pump and the pump is operable under the control of the pump controls 36B. The pump controls 36B are in communication with the pump and the pump is operable under control of the pump controls 36B with the second handle portion 34B2 in any of the pivoted positions.

The illustrated pump controls 36B include two operation levers 72B (e.g., advance controls) and a reset button 80B (e.g., a pump ON/OFF). One operation lever 72B is positioned on each handle portion 34B1, 34B2, and each lever 72B faces the wrench 20B when the control assembly 11B is coupled to the wrench 20B. The levers 72B are positioned on the handle portions 34B so both levers 72B cannot be actuated with one hand of the operator. The levers 72B are each angled to the respective handle portions 34B and are arranged at an Oblique angle to each other.

Each lever 72B operates a respective switch 104, and the reset button 80B operates a reset switch 106. The pump controls 36B send control signals to the pump, and the type of control signals depend on, for example, the switch, the power source (e.g., the pump), the drive mechanism of the wrench 20B, relative movement between the components (e.g., between the handle assembly and the wrench 20B, between the second handle portion 34B2 and the body 12B and the supported switches), etc.

Figure 32:
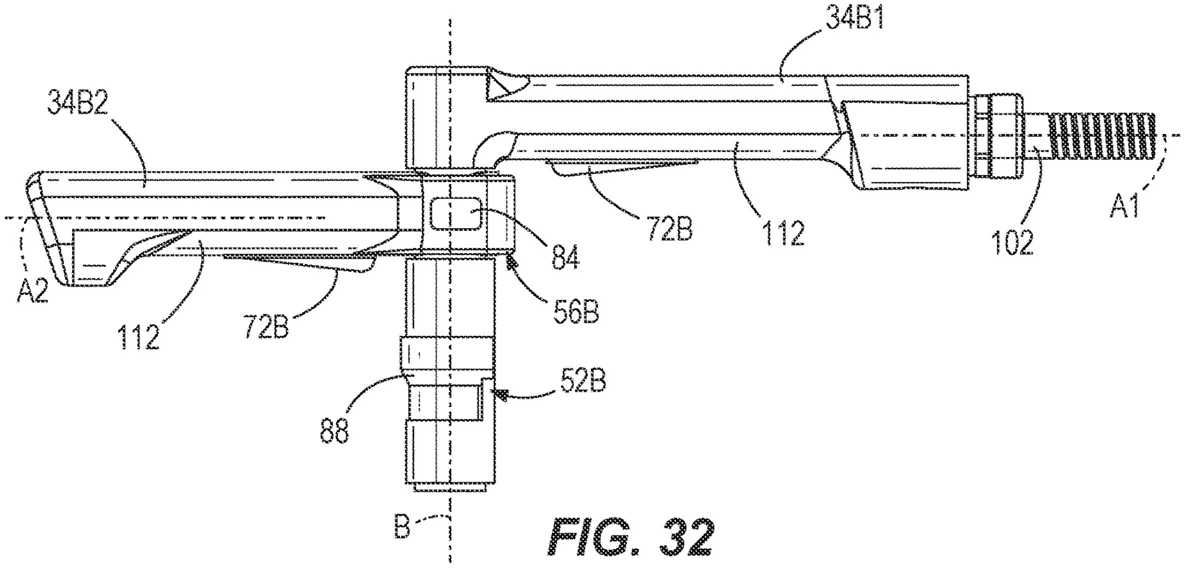
FIG. 32 is a side view of the handle assembly of FIG. 30.
Figure 33:
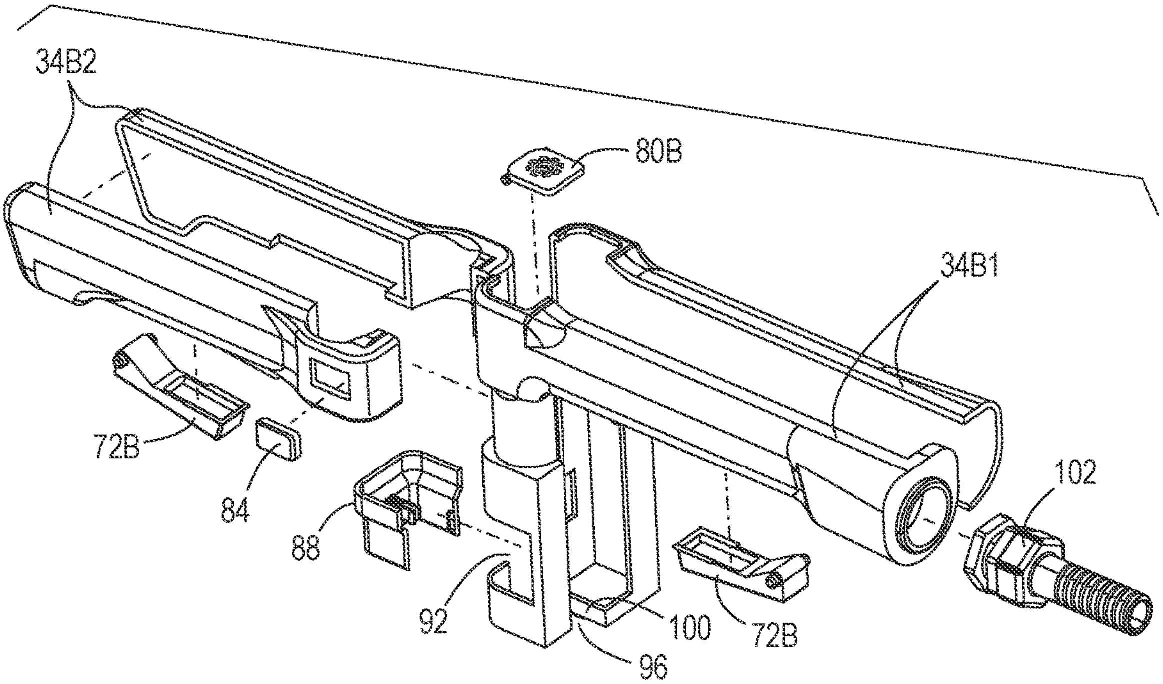
FIG. 33 is an exploded view of the handle assembly of FIG. 30.

Referring to FIGS. 32-33, the control assembly 11B includes a strain relief 102 which couples the control assembly 11B to a hose or to an electrical conductor (e.g., a cable, a wire, etc.) coupled to the pump. The strain relief 102 is movably coupled to a distal end of the first handle portion 34B1 (e.g., pivotable or swivelable about the first axis A1 of first handle portion 34B1). The strain relief 102 may prevent the hose or cord from twisting and tangling.

In some constructions, the control signals can be pneumatic signals, and each of the switches 104, 106 can be an air switch. The hose, or conduit, connected to the strain relief 102 can communicate the signals from the pump controls 36B to the pump.

In some constructions, the control signals include electrical signals, and each switch 104, 106 is an electrical switch in communication with the pump. The electrical conductor connected to the strain relief 102 can communicate the signals from the pump controls 36B to the pump. In some constructions, the communication can be wireless, and the control assembly 11B may include a wireless interface.

Each handle portion 34B has an underside 112 facing the wrench 20B when the control assembly 11B is connected to the wrench 20B. Each underside 112 supports a lever 72B and provides a non-slip surface 113. The non-slip surface 113 has a higher coefficient of friction than the rest of the handle portion 34B and may prevent the operator's hand, especially when wearing gloves, from slipping relative to the handle portion 34B. In some constructions (not shown), the entirety of the handle portions 34B may have the non-slip surface 113.

The illustrated control assembly 11B is more compact (compared to the control assembly 11A). Also, with the connection at the bottom end 14B of the body 12B, the control assembly 11B may improve carrying of the wrench 20B by being positioned over the center of gravity. Also, in use, the control assembly 11B orients the operator directly above the wrench 20B which may improve control, operation, etc. of the wrench 20B.

FIGS. 38-41 illustrate a portion of another alternative construction for controls 10C, including a control assembly 11C for use with a tool, such as a piston-style torque wrench 20C. The control assembly 11C is similar to the control assembly 11, shown in FIGS. 1-7, the control assembly 11A, shown in FIGS. 8-27, and the control assembly 11 B, shown in FIGS. 28-37, and described above. Common elements have the same reference number "C" or "C#", with "#" representing the number of a sub-element of the common element.

The illustrated control assembly 11C has a different locking arrangement 52C disposed between the handle assembly and the wrench 20C to selectively connect and hold these components in one or more selected positions. The locking arrangement 52C includes a positive locking mechanism (e.g., one or more ball bearings 120 on the handle portion 34C engageable in a groove 120 on the adapter 60C). The ball bearing(s) 120 are supported in a cage 128 defining a corresponding number of openings 132 through which each bail bearing 120 projects and retracts relative to the groove 124.

An actuator mechanism 136 is operable to move the ball bearing(s) 120 at least from a locked position (see FIG. 39), in which the ball bearing(s) 120 are engageable with the groove 124 to retain the handle portion 34C on the adapter 60C (and on the wrench 20C), to an unlocked position (see FIG. 40), in which the ball bearing(s) 120 disengage the groove 124 and the handle portion 34C is movable relative to the adapter 60C (and the wrench 20C). The actuator mechanism 136 includes a slidable shaft 140 with a ridge 144, engageable with the ball bearing(s) 120 in the locked position (see FIG. 39) to force the ball bearing(s) 120 into the groove 124, and a recess 148, allowing the ball bearings) 120 to disengage the groove 124 in the unlocked position (see FIG. 40).

Actuator buttons 152 protrude through openings 156 in the handle portion 34C and are operable to move the shaft 140 at least from the locked position to the unlocked position. The buttons 152 have angled surfaces 160 engageable with complementary angled surfaces 164 on the shaft 140 (e.g., on a separate member 168 connected to the shaft 140). Depressing the buttons 152 causes the angled surfaces 160, 164 to move the shaft 140 from the locked position (in FIG. 39), in which the ridge 144 forces the ball bearing(s) 120 into the groove 124, to the unlocked position (in FIG. 40), in which the ball bearing(s) 120 disengage the groove 124 and are received in the recess 148 in the shaft 140. Each button 152 has a ridge 172 extending along its angled surface 160 and received in a groove (not shown) in the corresponding angled surface 164 of the member 168 to guide movement.

The ball bearing(s) 120 are biased toward engagement with the groove 124 by a biasing member (e.g., a spring 176) between the handle portion 34C and the ball bearing(s) 120 (e.g., between the cage 128 and the shaft 140). In the illustrated construction, the shaft 140 is biased toward the adapter 60C (downwardly in FIGS. 39-40) so that the ridge 144 is engageable with the ball bearing(s) 120 to force the ball bearing(s) 120 through cage 128 and into the groove 124.

The illustrated locking arrangement 52C includes inter-engaging surfaces on the handle portion 34C and the adapter 60C to inhibit relative pivoting movement of the handle portion 34C. The illustrated surfaces also define a number of pivoted positions of the handle portion 34C relative to the adapter 60C.

A ring 180 supported on the handle portion 34C has an opening 184 for receiving an end 188 of the adapter 60C. The opening 184 and the end 188 are provided with the surfaces defining the pivoted positions of the handle portion 34C relative to the adapter 60C and thereby to the wrench 20C. In the illustrated construction, the opening 184 has a hexagonal shape, and the end 188 has a complementary shape. In the unlocked position, the ring 180 disengages the end 188 and the handle portion 34C can be pivoted relative to the adapter 60C. In the desired pivoted position, the opening 184 receives the end 188 with the hexagonal surfaces engaged, and the buttons 152 are released so that the shaft 140 moves under the bias of the spring 176 to the locked position.

In other constructions (not shown), another mechanism may be provided to selectively hold the handle portion 34C is a pivoted position relative to the wrench 20C. For example, rather than an annular groove 124, the adapter 60C may define discrete recesses (not shown), each corresponding to a defined pivoted position and operable to receive a ball bearing 120 in that position.

Figure 39:
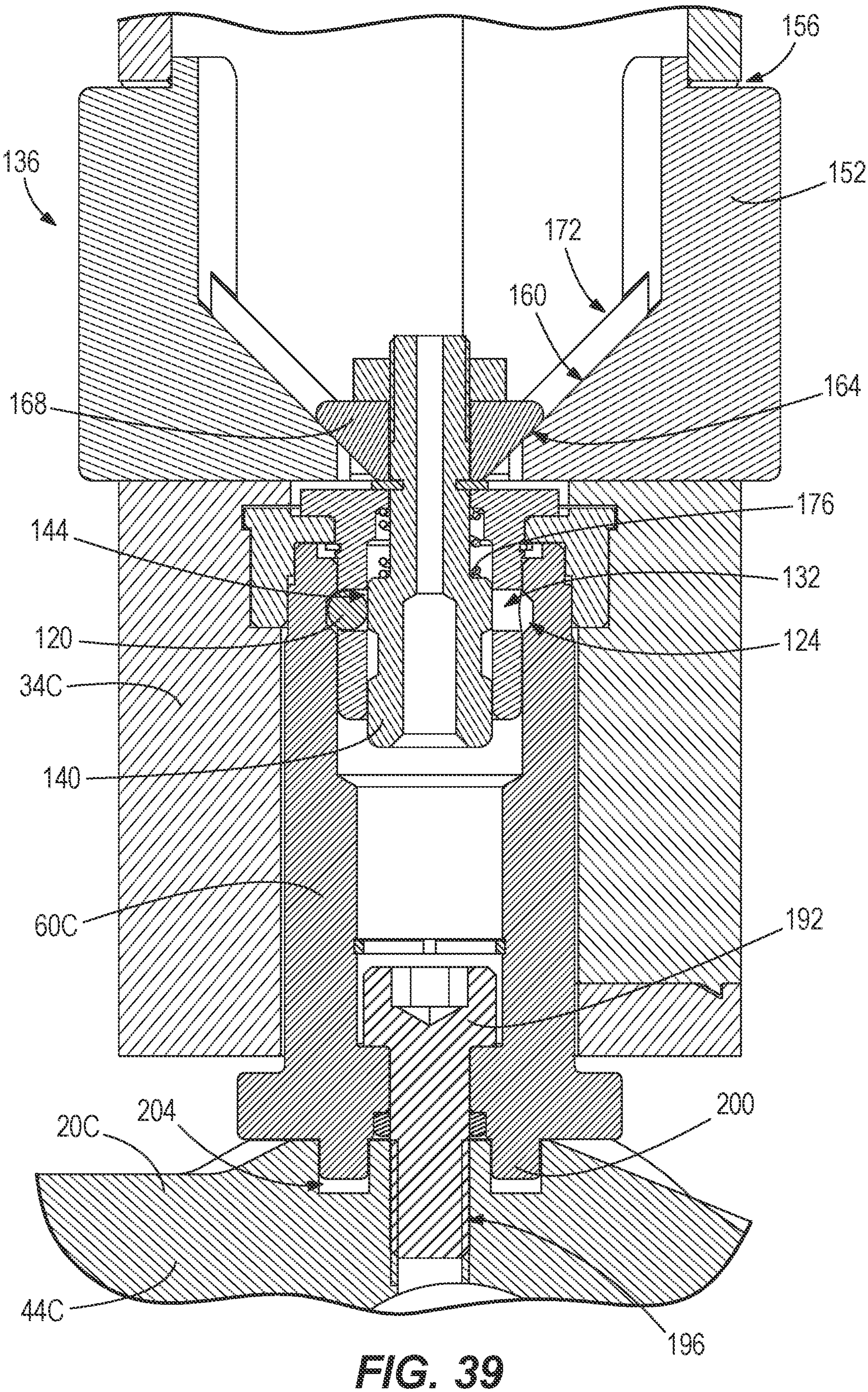
FIG. 39 is a cross-sectional view of the tool of FIG. 38, illustrating the locking mechanism in a locked condition.
Figure 40:
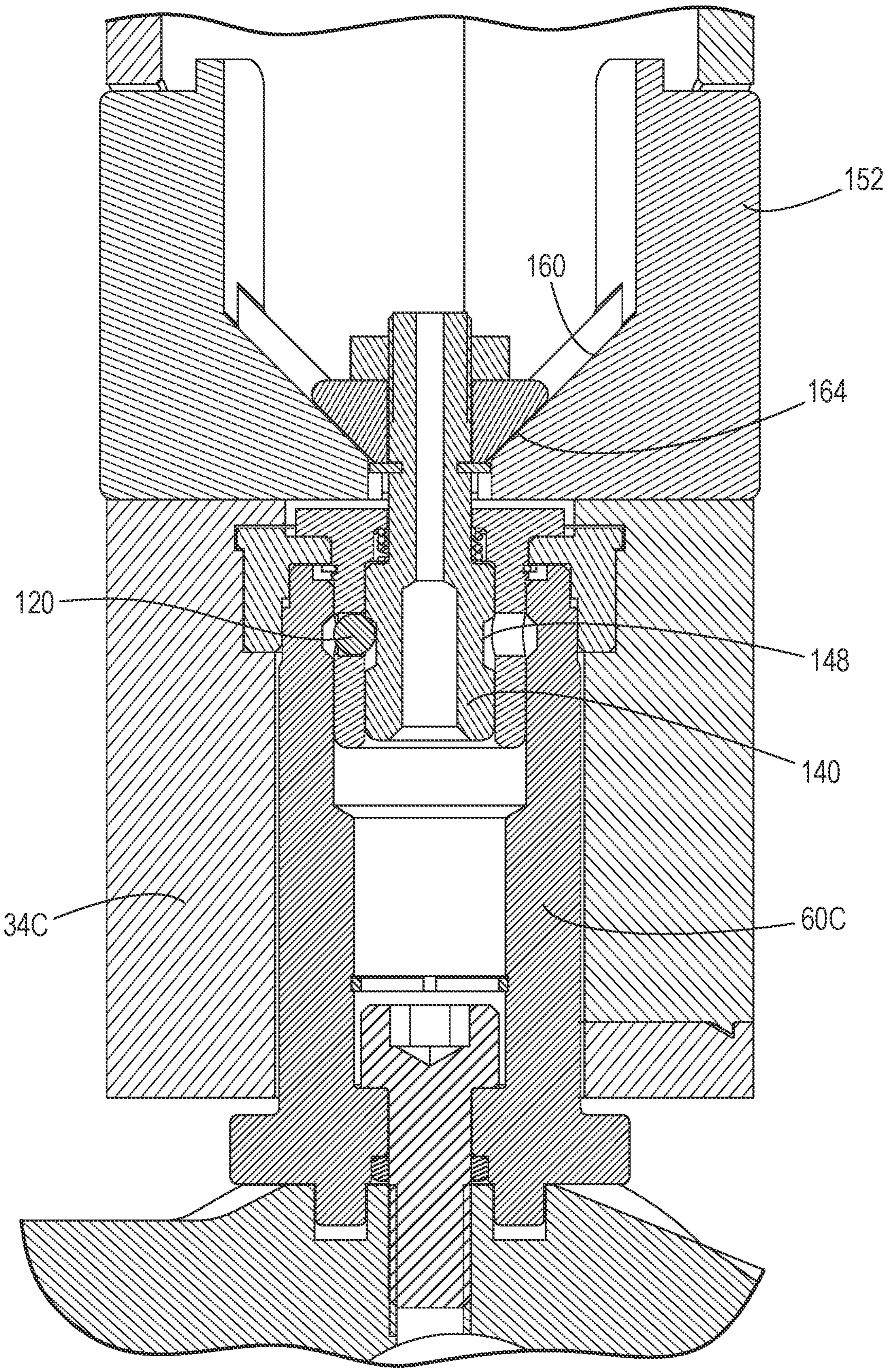
FIG. 40 is a cross-sectional view of the tool of FIG. 38, illustrating the locking mechanism in an unlocked condition.
Figure 41:
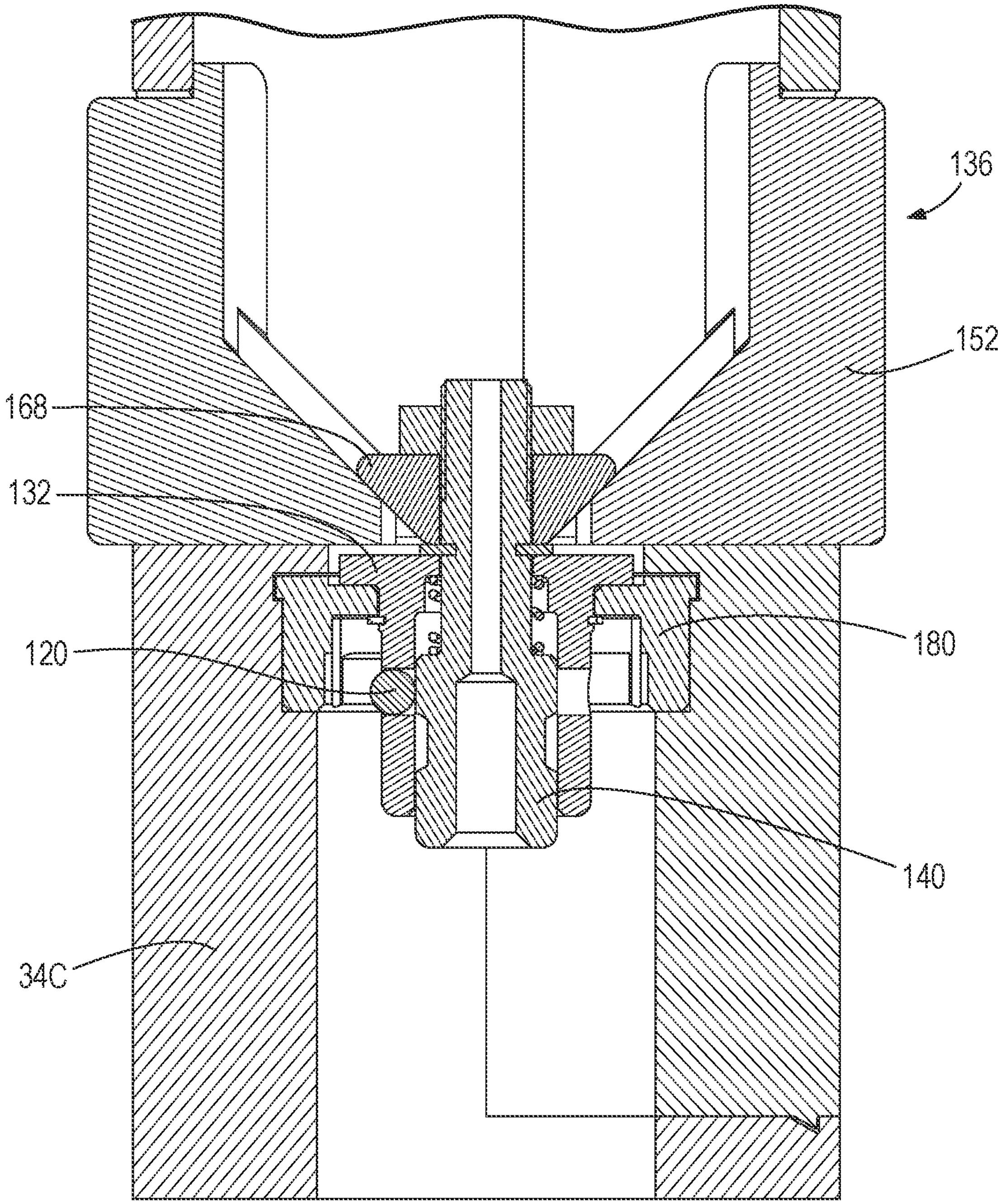
FIG. 41 is a cross-sectional view of a portion of the handle assembly of FIG. 38.

As shown in FIGS. 39-40, the adapter 60C is connected to the wrench housing 44C by a fastener (e.g., a cap screw 192) received in a threaded recess 196 in the housing 44C. Projections 200 on the adapter 60C engage recesses 204 on the housing 44C to inhibit pivoting movement of the adapter 60C relative to the housing 44C.

Figure 42:
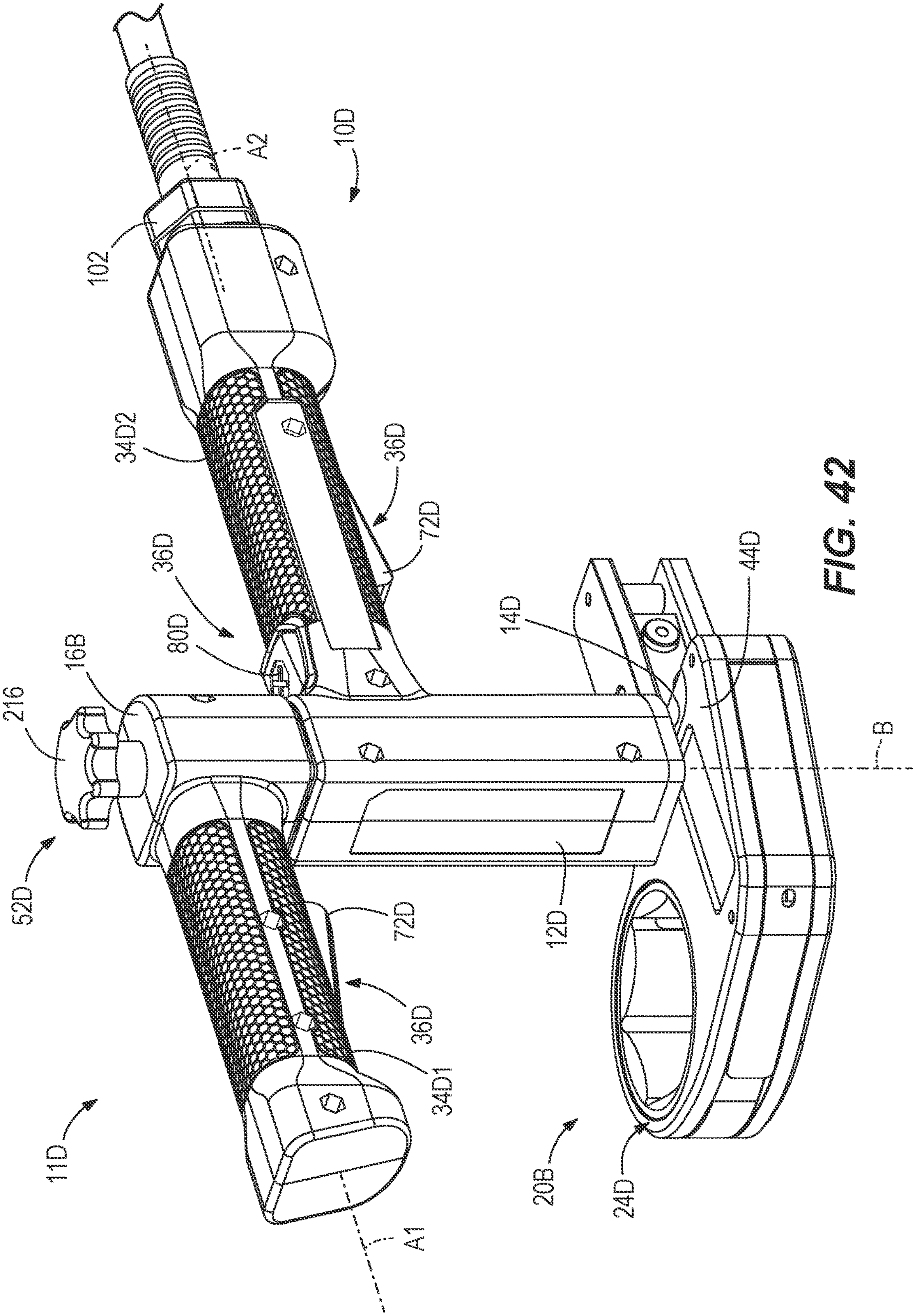
FIG. 42 is a perspective view of yet another alternative embodiment of a tool, such as a reciprocating piston fluid-operated torque wrench, having integrated controls, illustrating a handle assembly connected to the tool.
Figure 43:
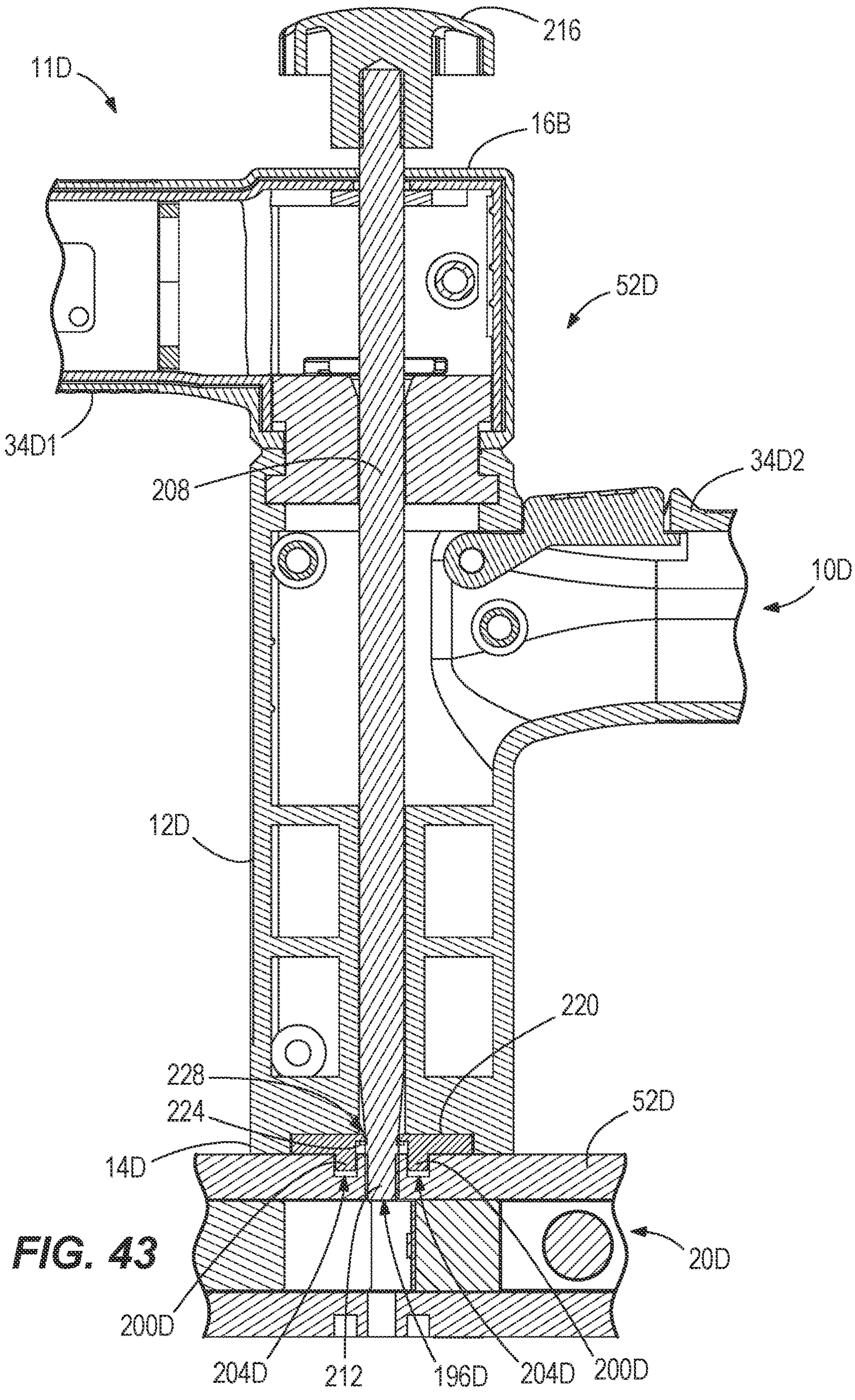
FIG. 43 is a cross-sectional view of a portion of the tool and the handle assembly of FIG. 42.
Figure 44:
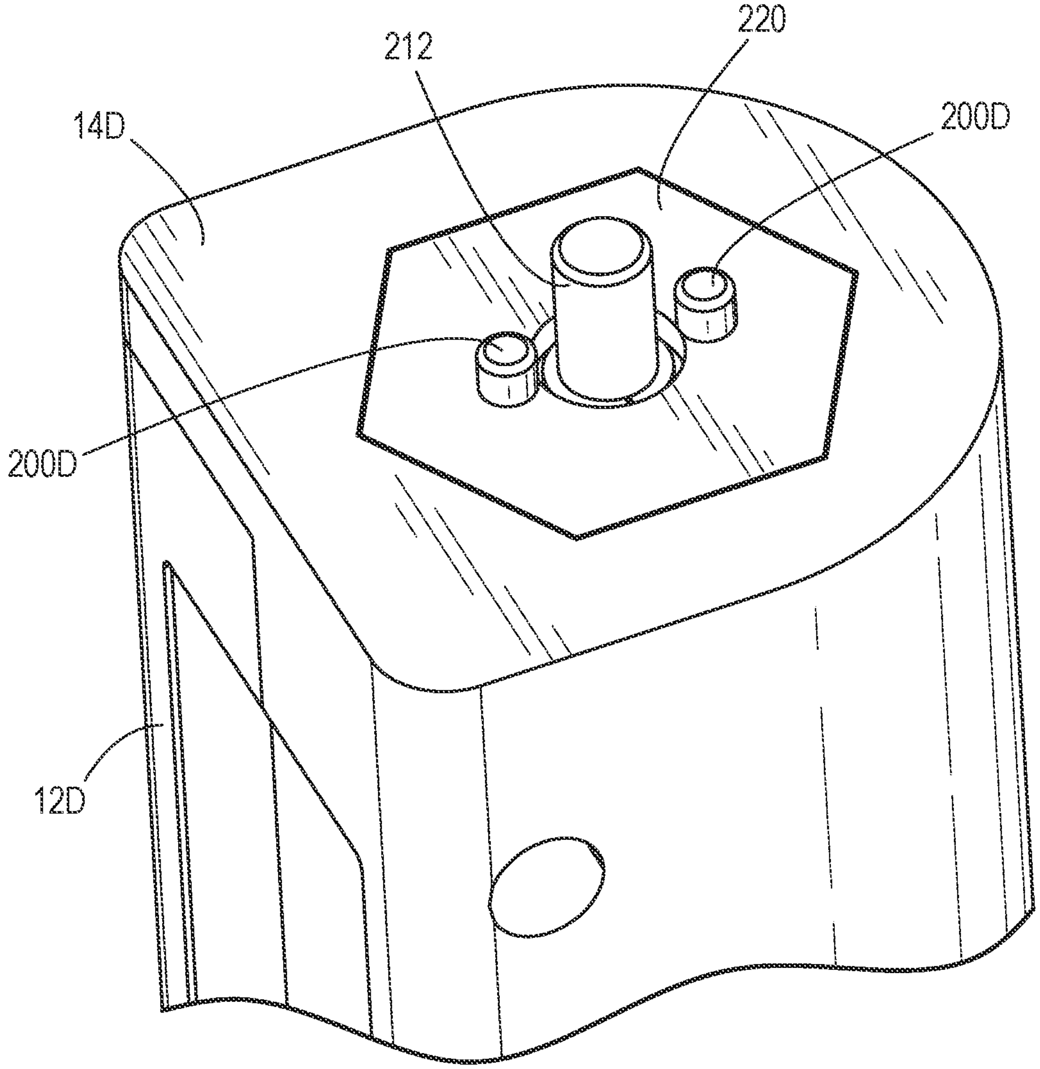
FIG. 44 is an enlarged perspective view of an end of the handle assembly.

FIGS. 42-44 illustrate a portion of another alternative construction for controls 10D, including a control assembly I ID for use with a tool, such as a piston-style torque wrench 201), The control assembly 11D is similar to the control assembly 11, shown in FIGS. 1-7, the control assembly 11A, shown in FIGS. 8-27, the control assembly 11B, shown in FIGS. 28-37, and the control assembly 11C, shown in FIGS. 38-41, and described above. Common elements have the same reference number "D" or "D#", with "#" representing the number of a sub-element of the common element.

The illustrated control assembly 11D has a different locking arrangement 521) disposed between the handle assembly and the wrench 20D to selectively connect and hold these components in one or more selected positions. The locking arrangement 521) includes (see FIG. 43) a rod 208 having a threaded end 212 (e.g., with a threaded length of about 8 millimeters (mm) to about 10 mm) threaded into the threaded recess 196D in the tool housing 44D. The rod 208 extends through the handle body 12D and the upper handle portion 34D1. An actuator knob 216 is connected to the opposite end of the rod 208. Rotation of the knob 216 causes the threaded end 212 to threaded into or out of the threaded recess 196D to connect or disconnect, respectively, the control assembly 11D and the tool 20D.

In other constructions (not shown), rather than a threaded engagement, the rod 208 may have a different engagement with the tool housing 44D. For example, the rod 208 may a quarter-turn connection, a bayonet connection, etc. with the tool housing 44D.

When the rod 208 is tightened, the knob 216 presses the second handle portion 34D2 against the first handle portion 34D1 to fix the relative pivoted positions of the handle portions 34D1, 34D2. The handle portions 34D1, 34D2 include inter-engaging teeth (not shown) to further retain the handle portions 34D1, 34D2 in position.

The control assembly 11D includes an interface member 220 with projections 2001 engaging recesses 204D on the housing 44D to inhibit pivoting movement of the control assembly 11D relative to the housing 44D. Due to the arrangement of the projections 200D and the recesses 204D, the interface member 220 (along with the control assembly 11D) is positionable relative to the housing 44D in a number of pivoted positions. As shown in FIG. 44, the handle body 12B and the interface member 220 have a non-circular engagement (e.g., a hexagonal shape) to inhibit relative pivoting movement.

The rod 208 and the interface member 220 are retained on the control assembly 11D. In the illustrated construction (see FIG. 43), a retaining clip or ring 224 is received in a groove 228 below the interface member 220.

As noted above, with the illustrated control assembly 11, 11A, 11B, 11C, 11D, the operator will actuate two buttons 36, 36A, 36B, 36C, 36D at the same time—one with each hand—in order for the pump to provide fluid to the wrench 20, 20A, 2013, 20C, 20D. Again, this feature may ensure that the operator's hands are on the handles 34, 34A, 34B, 34C, 34D and free of pinch points prior to operation of the wrench 20, 20A, 2013, 20C, 20D and the pump. This mode of operation is effective with the control assembly 11, 11A, 11B, 11C, 11D attached to the wrench 20, 20A, 20B, 20C, 20D or detached from the wrench 20, 20A, 20B, 20C, 20D due to space constraints of the fastening location.

Although the invention has be described in detail with reference to certain preferred embodiments, variations and modifications exist within the scope and spirit of one or more independent aspects of the invention as described above. For example, the illustrated embodiment utilizes two-button control to ensure both hands are free of pinch points. In other embodiments, one or more sensors (e.g., capacitive touch sensors, dead man's switches, etc.) can be incorporated into each handle to ensure both hands are free from pinch points prior to actuation of the wrench.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the invention may be set forth in the following claims:

What is claimed is:

1. A control assembly for a fluid-operated tool, the tool including a housing, and a drive mechanism supported by the housing, the drive mechanism being selectively-driven by a fluid pump and operable to drive an output member, the control assembly comprising:
- a handle assembly removably connectable to the housing and including a first handle portion and a second handle portion, wherein the second handle portion is positionable in a first position when the handle assembly is connected to the housing and in a second position relative to the first handle portion when the handle assembly is connected to the housing; and
- pump controls supported by the handle assembly and removably connectable to the housing therewith, wherein the pump controls are operable to control the pump to drive the drive mechanism and thereby the output member, the pump controls including:
  - a first pump control operable by a digit of an operator's first hand on the first handle portion, the first pump control being in communication with the pump; and
  - a second pump control operable by a digit of the operator's second hand on the second handle portion, the second pump control being in communication with the pump;
- wherein the pump is operable under the control of the pump controls to drive the drive mechanism when the handle assembly is connected to the housing and when the handle assembly is disconnected from the housing.

2. The control assembly of claim 1, wherein operation of the pump requires the operator's first hand on the first handle portion and the operator's second hand on the second handle portion.

3. The control assembly of claim 1, wherein the second handle portion is pivotable relative to the first handle portion.

4. The control assembly of claim 1, wherein the handle assembly further includes a locking assembly operable to selectively retain the second handle portion in the first position and in the second position relative to the first handle portion.

5. The control assembly of claim 1, wherein the handle assembly includes a body having a first end connectable to the housing and an opposite, second end, the body defining a body axis extending between the first end and the second end, and wherein the first handle portion extends along a first axis and the second handle portion extends along a second axis, each of the first axis and the second axis being substantially perpendicular to the body axis.

6. The control assembly of claim 5, wherein at least one of the first handle portion and the second handle portion is movably connected to the body.

7. The control assembly of claim 1, wherein the first handle portion extends along a first axis and the second handle portion extends along a second axis, and wherein the second handle portion is movable relative to the first handle portion to a position with the first axis and the second axis being parallel.

8. The control assembly of claim 1, wherein each pump control includes a switch and an actuator engageable by a digit of an operator's hand to operate the switch.

9. The control assembly of claim 8, wherein the switch includes an air switch, and wherein the pump controls further include a conduit connecting the air switch to the pump.

10. The control assembly of claim 8, wherein the switch includes an electrical switch, the electrical switch being in communication with the pump.

11. The control assembly of claim 10, wherein the pump controls further includes an electrical conductor electrically connecting the electrical switch with the pump.

12. The control assembly of claim 10, wherein the pump controls further includes a wireless interface communicating between the electrical switch and the pump.

13. A tool comprising:
- a housing;
- a drive mechanism supported by the housing, the drive mechanism being selectively- driven by a fluid pump and operable to drive an output member; and
- a control assembly including:
  - a handle assembly removably connectable to the housing and including a first handle portion and a second handle portion, wherein the second handle portion is positionable in a first position when the handle assembly is connected to the housing and in a second position relative to the first handle portion when the handle assembly is connected to the housing; and
  - pump controls supported by the handle assembly and removably connectable to the housing therewith, wherein the pump controls are operable to control the pump to drive the drive mechanism and thereby the output member, the pump controls being in communication with the pump:
  - a first pump control supported proximate the first handle portion, the first pump control being operable by a digit of a first hand of an operator gripping the first handle portion; and
  - a second pump control supported proximate the second handle portion, the second pump control being operable by a digit of a second hand of the operator on the second handle portion;
- wherein operation of the pump requires the operator's first hand on the first handle portion and the operator's second hand on the second handle portion; and
- wherein the pump is operable under the control of the pump controls to drive the drive mechanism when the handle assembly is connected to the housing and when the handle assembly is disconnected from the housing.

14. The tool of claim 13, wherein operation of the pump requires the operator's first hand on the first handle portion and the operator's second hand on the second handle portion.

15. The tool of claim 13, wherein the second handle portion is pivotable relative to the first handle portion.

16. The tool of claim 13, wherein the handle assembly further includes a locking assembly operable to selectively retain the second handle portion in the first position and in the second position relative to the first handle portion.

17. The tool of claim 13, wherein the handle assembly includes a body having a first end connectable to the housing and an opposite, second end, the body defining a body axis extending between the first end and the second end, and wherein the first handle portion extends along a first axis and the second handle portion extends along a second axis, each of the first axis and the second axis being substantially perpendicular to the body axis.

18. The tool of claim 13, wherein the first handle portion and/or the second handle portion moves relative to the housing with the second handle portion in the first position as compared to the second handle portion being in the second position.

19. The tool of claim 13, wherein the first handle portion is positionable in a first position and in a second position relative to the housing when connected thereto.

20. The tool of claim 19, wherein the first handle portion is pivotable relative to the housing.

21. The tool of claim 13, wherein the handle assembly further includes a locking assembly operable to selectively retain the second handle portion in the first position and in the second position relative to the housing.

22. The tool of claim 13, wherein each pump control includes a switch and an actuator engageable by a digit of an operator's hand to operate the switch.

23. The tool of claim 22, wherein the switch includes an air switch, and wherein the pump controls further include a conduit connecting the air switch to the pump.

24. The tool of claim 22, wherein the switch includes an electrical switch, the electrical switch being in communication with the pump.

25. The tool of claim 24, wherein the pump controls further includes an electrical conductor electrically connecting the electrical switch with the pump.

26. The tool of claim 24, wherein the pump controls further includes a wireless interface communicating between the electrical switch and the pump.

27. A method of operating a fluid-operated tool, the tool including a housing and a drive mechanism supported by the housing and operable to drive an output member, the method comprising:

providing a control assembly including a handle assembly separate from the housing, the handle assembly including a first handle portion, a second handle portion, and at least one pump control, the first handle portion and the second handle portion being movably coupled together;

moving the second handle portion from being coupled to the first handle portion in a first position relative thereto to being coupled in a second position relatively thereto;

selectively and alternatively releasably connecting the handle assembly to the housing and disconnecting the handle assembly from the housing;

positioning the output member relative to a fastener to be adjusted;

when the handle assembly is connected to the housing, after positioning, operating a fluid pump to drive the drive mechanism and thereby the output member, operating including sensing an operator's first hand on the first handle portion while sensing the operator's second hand on the second handle portion, wherein sensing the operator's first hand or the operator's second hand is provided at least in part via the pump control; and when the handle assembly is disconnected from the housing, after positioning, operating the fluid pump to drive the drive mechanism and thereby the output member, operating including sensing the operator's first hand on the first handle portion while sensing the operator's second hand on the second handle portion.

* * * * *